(12) United States Patent
Allwein et al.

(10) Patent No.: US 9,988,143 B2
(45) Date of Patent: Jun. 5, 2018

(54) LANDING GEAR DEPLOYMENT SYSTEMS AND METHODS

(71) Applicant: General Atomics Aeronautical Systems, Inc., Poway, CA (US)

(72) Inventors: Michael Allwein, San Diego, CA (US); Joseph Moore, Ramona, CA (US); Aron Howard Daria, San Diego, CA (US)

(73) Assignee: General Atomics Aeronautical Systems, Inc., Poway, CA (US)

( * ) Notice: Subject to any disclaimer, the term of this patent is extended or adjusted under 35 U.S.C. 154(b) by 438 days.

(21) Appl. No.: 14/614,330

(22) Filed: Feb. 4, 2015

(65) Prior Publication Data

US 2015/0291278 A1 Oct. 15, 2015

Related U.S. Application Data

(60) Provisional application No. 61/935,765, filed on Feb. 4, 2014.

(51) Int. Cl.
*B64C 25/30* (2006.01)
*B64C 25/20* (2006.01)
(Continued)

(52) U.S. Cl.
CPC .............. *B64C 25/20* (2013.01); *B64C 25/24* (2013.01); *B64C 25/30* (2013.01); *B64C 25/34* (2013.01)

(58) Field of Classification Search
CPC .................. B64C 25/30; F16H 2015/2071
(Continued)

(56) References Cited

U.S. PATENT DOCUMENTS

| 2,476,376 | A |   | 7/1949 | Laraque |
| 2,758,807 | A | * | 8/1956 | Ryan ....................... B64C 25/30 |
|   |   |   |   | 244/1 R |

(Continued)

FOREIGN PATENT DOCUMENTS

| GB | 1159065 | 7/1969 |
| WO | 2013184656 | 12/2013 |

OTHER PUBLICATIONS

EPO; App. No. 15153618.2; Extended European Search Report dated Jun. 25, 2015.

*Primary Examiner* — Brian M O'Hara
*Assistant Examiner* — Keith L Dixon
(74) *Attorney, Agent, or Firm* — Fitch, Even, Tabin & Flannery LLP

(57) ABSTRACT

Some embodiments provide apparatuses configured to deploy a landing gear of an aircraft, comprising: a landing gear coupler configured to couple with the landing gear; a release link configured to cooperate the landing gear coupler with a drive shaft that is configured to drive the landing gear between a stowed position and a deployed position; an override driver cooperated with the landing gear coupler; wherein the release link is configured to releasably maintain a relative position of landing gear coupler relative to the drive shaft, and the release link is configured to disengage a coupling between the drive shaft and the landing gear coupler such that the landing gear coupler is configured to move independent of the drive shaft; and wherein the override driver is configured to drive the landing gear coupler to the deployed position.

11 Claims, 14 Drawing Sheets

(51) Int. Cl.
 *B64C 25/24* (2006.01)
 *B64C 25/34* (2006.01)
(58) Field of Classification Search
 USPC .......................................... 244/100 R, 102 R
 See application file for complete search history.

(56) References Cited

U.S. PATENT DOCUMENTS

| | | | |
|---|---|---|---|
| 4,876,906 A | 10/1989 | Jones | |
| 6,311,927 B1* | 11/2001 | Elving | B64C 25/22 |
| | | | 244/100 R |
| 8,123,161 B1* | 2/2012 | Collins | B64C 25/26 |
| | | | 244/102 R |
| 9,447,855 B2* | 9/2016 | Mochizuki | F16H 25/2021 |
| 2007/0144846 A1 | 6/2007 | Bucheton | |
| 2010/0012779 A1* | 1/2010 | Collins | B64C 25/12 |
| | | | 244/102 R |
| 2016/0025199 A1* | 1/2016 | Boone | F16H 25/2204 |
| | | | 74/89.38 |
| 2016/0195115 A1* | 7/2016 | Fenn | B64C 25/30 |
| | | | 92/82 |

* cited by examiner

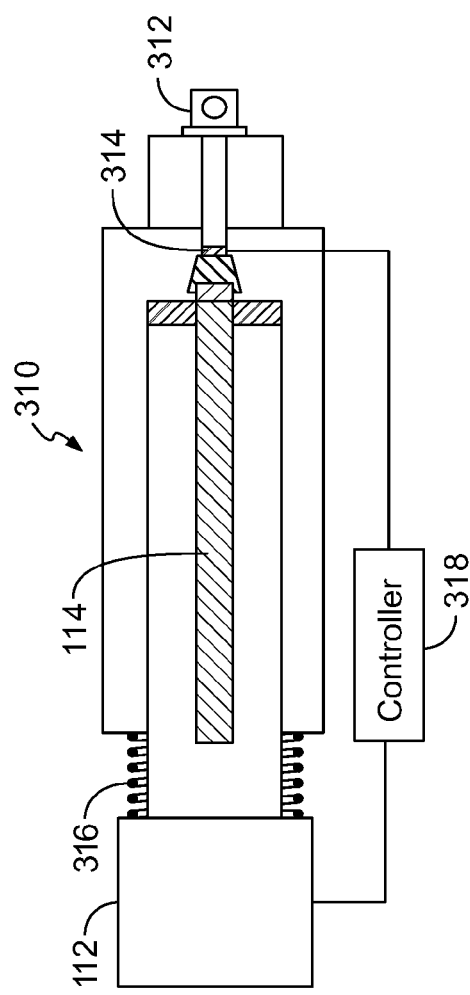
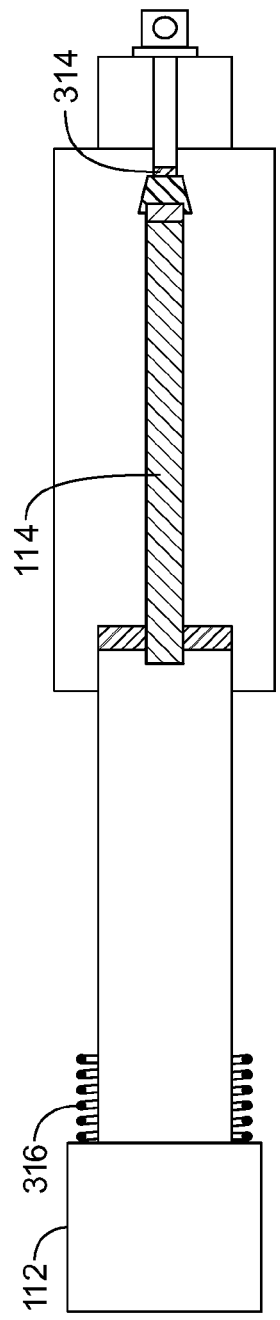

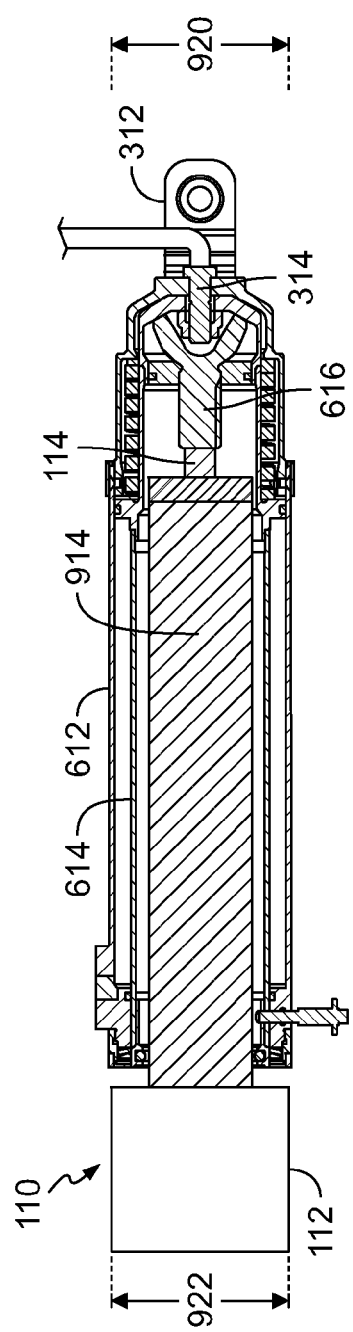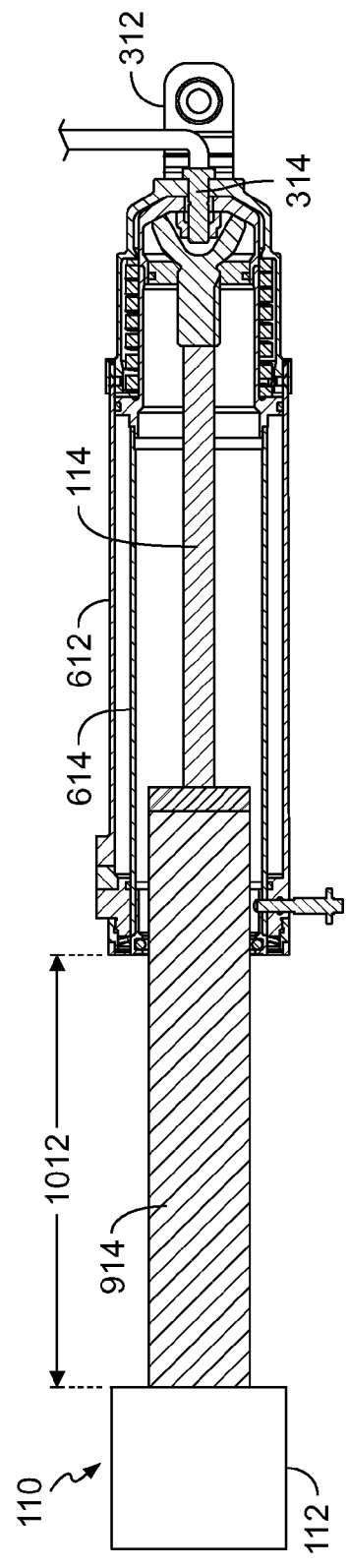

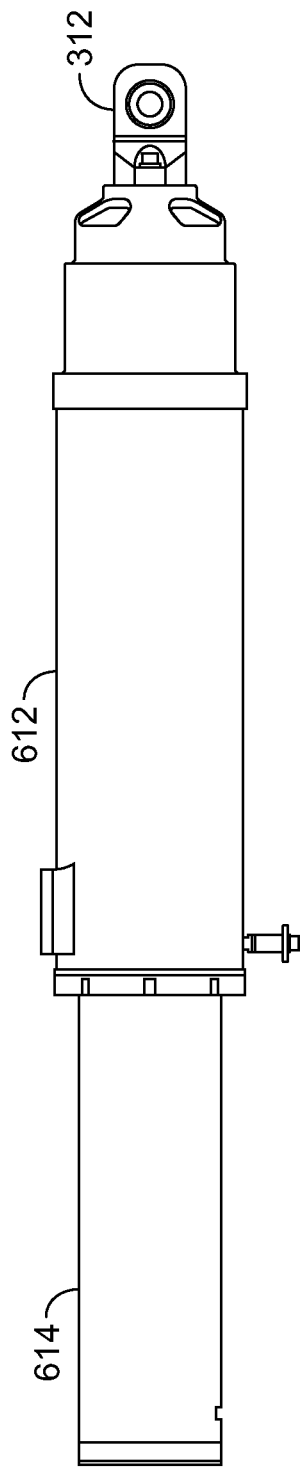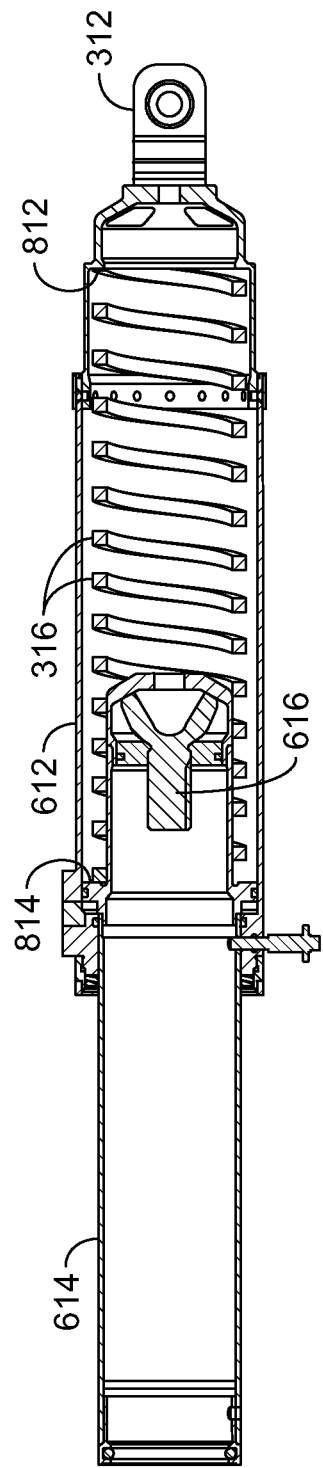

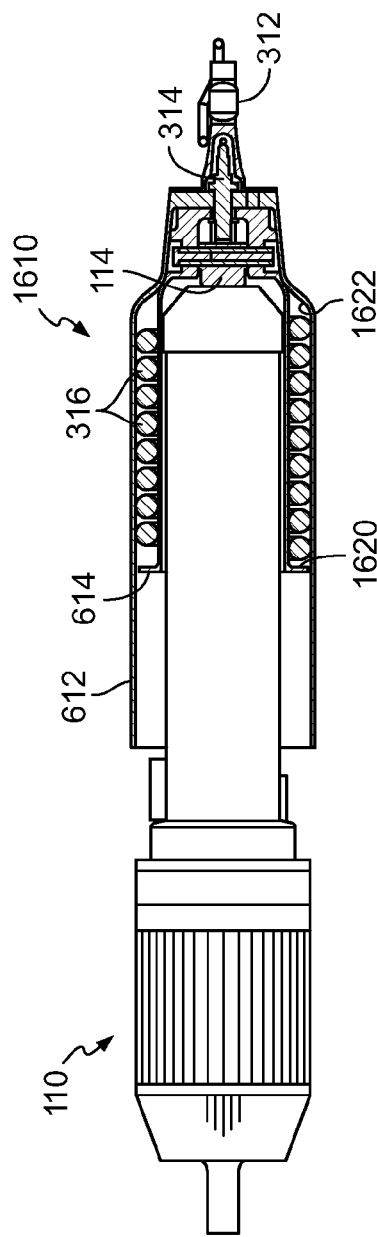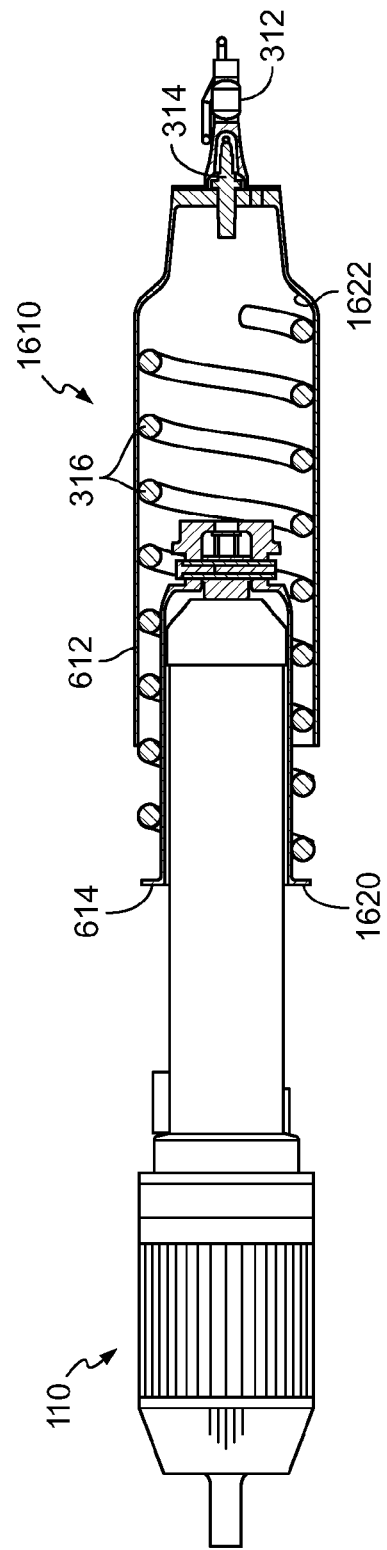

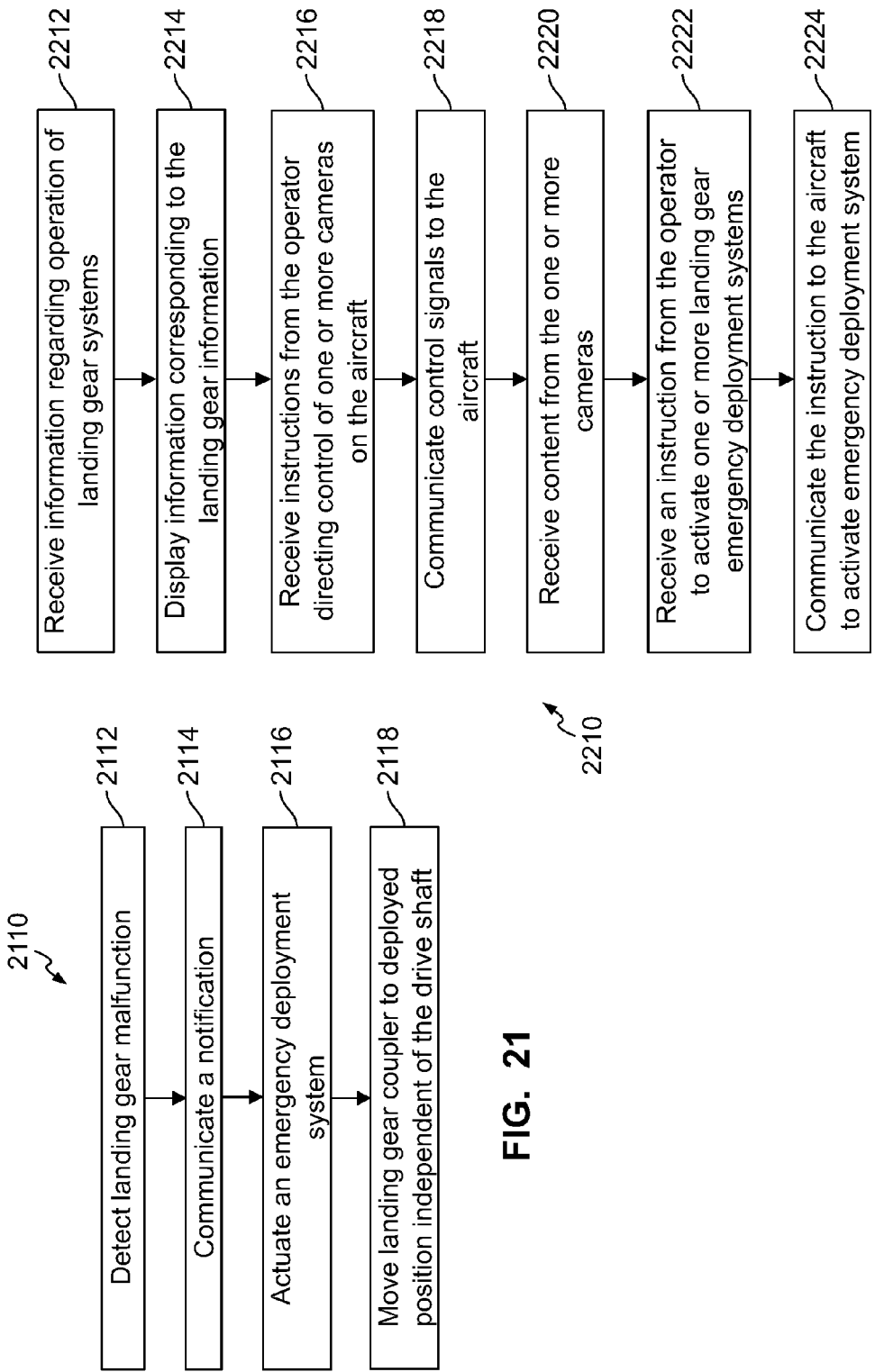

LANDING GEAR DEPLOYMENT SYSTEMS AND METHODS

This application claims the benefit of U.S. Provisional Application No. 61/935,765, filed Feb. 4, 2014, entitled LANDING GEAR DEPLOYMENT SYSTEMS AND METHODS, for Allwein et al., which is incorporated in its entirety herein by reference.

BACKGROUND

1. Field of the Invention

The present invention relates generally to aircrafts, and more specifically to aircraft landing gear.

2. Discussion of the Related Art

The use of aircrafts continues to increase as they are used for ever more diverse operations. Landing gear is critical to an aircraft. Many aircraft have landing gear that retract after takeoff. This can significantly reduce drag, which in turn allows for greater speeds and/or greatly increases the time the aircraft can remain aloft.

In some instances, however, the landing gear does not deploy or does not fully deploy. The failure of the landing gear to deploy typically requires a crash landing that does significant damage to the aircraft if not totally destroying the aircraft.

SUMMARY OF THE INVENTION

Some embodiments provide apparatuses configured to deploy a landing gear of an aircraft. The apparatuses comprise: a landing gear coupler configured to couple with the landing gear of the aircraft; a release link coupled with the landing gear coupler and configured to cooperate the landing gear coupler with a drive shaft of an electro-mechanical primary landing gear drive system, wherein the drive shaft is configured, in response to an actuator moving the drive shaft during normal intended operation of the primary landing gear drive system, to drive the landing gear between a stowed position and a deployed position; an override driver cooperated with the landing gear coupler, wherein the release link is configured to releasably maintain a relative position of landing gear coupler relative to the drive shaft such that a drive force from the drive shaft is transferred to the landing gear to effect movement of the landing gear between the stowed position and the deployed position, and the release link is configured to disengage a coupling between the drive shaft and the landing gear coupler such that the landing gear coupler is configured to move at least in a direction toward the deployed position independent of the drive shaft; and wherein the override driver is configured to drive the landing gear coupler, independent of the drive shaft, to force the landing gear to transition to the deployed position when the release link disengages the coupling between the landing gear coupler and the drive shaft.

Further, some embodiments provide methods of deploying landing gear, comprising: detecting a malfunction of a linearly actuated a landing gear of an airplane such that the landing gear cannot effectively deploy; communicating a notification that the landing gear has not fully deployed; activating a release link to disengage a coupling between a drive shaft of a primary landing gear drive system and a landing gear coupler that is coupled with the landing gear in response to an instruction to activate an emergency deployment of the landing gear; and causing the landing gear coupler to be moved independent of the drive shaft to a deployed position deploying the landing gear.

Further, some embodiments provide methods of deploying landing gear, comprising: activating a release link disengaging a coupling between a drive shaft and a landing gear coupler such that the landing gear coupler is configured to move at least in a direction toward a deployed position independent of the drive shaft, wherein the release link is configured, when engaged, to releasably maintain a relative position of the landing gear coupler relative to the drive shaft such that a drive force from the drive shaft is transferred, during normal intended operation of an electro-mechanical primary landing gear drive system, to the landing gear to effect movement of the landing gear between a stowed position and the deployed position; and moving the landing gear coupler, independent of the drive shaft, forcing the landing gear to transition to the deployed position when the release link disengages the coupling between the landing gear coupler and the drive shaft.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 shows a simplified block diagram of a cross-sectional view of an emergency and/or override deployment system cooperated with a primary landing gear drive system and in a primed or inactivated state or configuration, in accordance with some embodiments.

FIG. 4 shows a simplified block diagram of the cross-sectional view of the emergency deployment system of FIG. 3 still in a primed state and cooperated with a primary landing gear drive system, with the primary landing gear drive system in the extended or deployed position.

FIG. 9 illustrates a simplified, cross-sectional view of the emergency deployment system of FIGS. 6-8 in the primed stated and cooperated with a primary landing gear drive system, in accordance with some embodiments.

FIG. 10 illustrates a simplified, cross-sectional view of the emergency deployment system of FIGS. 6-9, in accordance with some embodiments, with the primary landing gear drive system in the extended or deployed position.

FIG. 11 shows a plane view of an emergency deployment system, in accordance with some embodiments, in the actuated state.

FIG. 12 shows a simplified cross-sectional view of the emergency deployment system, in accordance with some embodiments, in an actuated or deployed state.

FIG. 16 shows a simplified cross-sectional view of an emergency deployment system cooperated with a primary landing gear drive system, in accordance with some embodiments.

FIG. 17 shows a simplified cross-sectional view of the emergency deployment system of FIG. 16 cooperated with a primary landing gear drive system and in an actuated or deployed state.

FIG. 21 shows a simplified flow diagram of a process of controlling one or more landing gear emergency deployment systems, in accordance with some embodiments.

FIG. 22 shows a simplified flow diagram of a process of controlling one or more emergency deployment systems, in accordance with some embodiments.

Figure 1:
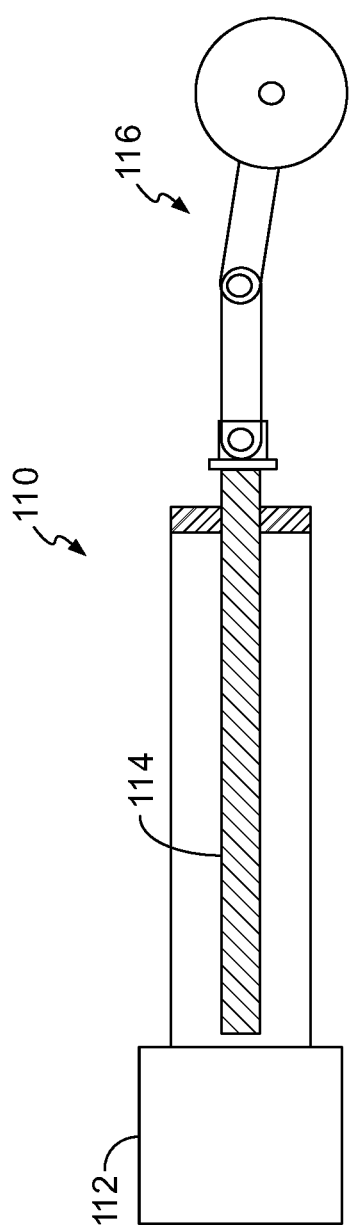
FIG. 1 shows a simplified block diagram of a cross-sectional view of a primary landing gear drive system coopered with a landing gear, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Landing gear of airplanes and other aircraft is critical to the airplane, as well as any equipment, personnel and passengers that are carried by the airplane. Accordingly, the failure of the landing gear system can result in significant damage to the airplane and any equipment, personnel and/or passengers. Some embodiments detect a failure and/or partial failure of a landing gear system and override the landing gear system to deploy the landing gear to allow the airplane to safely land. Accordingly, some embodiments provide an alternative system to deploy or extend the landing gear in the event the primary system failed or malfunctioned. Further, the alternative or emergency deployment system, in some embodiments, is fully redundant and can deploy the landing gear independent of the operation of the primary landing gear system.

FIG. 1 shows a simplified block diagram of a cross-sectional view of a primary landing gear drive system 110 cooperated with a landing gear 116, in accordance with some embodiments. Further, in some embodiments, the primary landing gear drive system is an electro-mechanical landing gear system, while in other embodiments, the landing gear system may be a hydraulically actuated landing gear system. The primary landing gear drive system 110 includes at least a primary actuator or driver 112 and a drive shaft 114 that is configured to couple directly or indirectly with a landing gear 116. The primary actuator 112 cooperates with the drive shaft 114 (sometimes referred to as an output shaft) to transition the drive shaft 114 between a retracted or stowed position to an extended or deployed position. In many embodiments, the primary actuator 112 is a linear electro-mechanical actuator that drives the drive shaft to linearly transition between stowed and deploy positions. For example, in some implementations the primary actuator 112 comprises a linear servo. FIG. 1 shows the drive shaft 114 in the stowed position such that the landing gear is retracted and stowed during flight and not in use.

Figure 2:
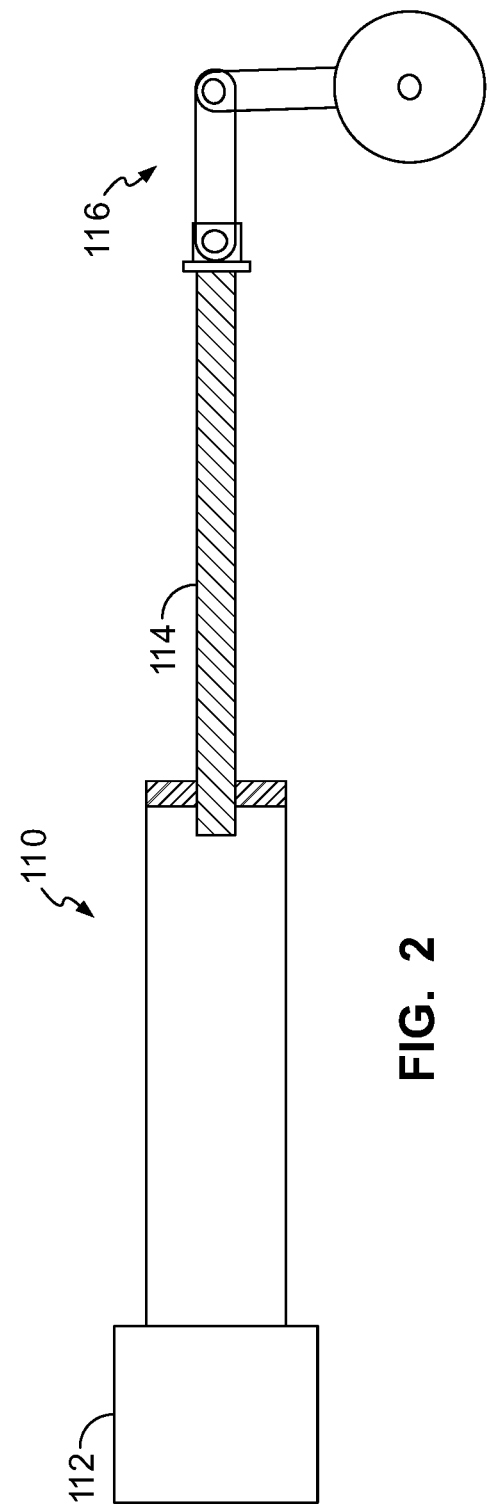
FIG. 2 shows the simplified block diagram of the cross-sectional view of the primary landing gear drive system of FIG. 1, in accordance with some embodiments, where the drive shaft is in the deployed position.

FIG. 2 shows the simplified block diagram of the cross-sectional view of the primary landing gear drive system 110 of FIG. 1, in accordance with some embodiments, where the drive shaft is in the deployed position. In the deployed position, the drive shaft is extended to drive the landing gear 116 out and into the deployed position such that the landing gear is positioned for use to contact a landing surface and support the weight of the airplane. In many embodiments, the primary actuator 112 is a linear actuator and driver that linearly drive the drive shaft between the stowed and deployed positions.

As introduced above, in some implementations an error or malfunction may occur that inhibits the landing gear system from operating as intended such that the landing gear cannot be deployed or cannot be sufficiently deployed to safely support the airplane during landing. For example, one or more sensors may detect whether the landing gear is fully deployed and/or deployed to a sufficient level to safely land the airplane. Accordingly, some embodiments provide an emergency or safety override deployment system that is configured to deploy the landing gear even when the drive section of the landing gear system is not operating effectively.

FIG. 3 shows a simplified block diagram of a cross-sectional view of a landing gear emergency and/or override deployment system 310 cooperated with a primary landing gear drive system 110 and in a primed or inactivated state or configuration, in accordance with some embodiments. In some embodiments, the emergency deploy or deployment system 310 comprises one or more landing gear couplers 312, a release link 314, an override driver 316, and a trigger and/or control circuitry 318. Further, FIG. 3 shows the landing gear system in the retracted or stowed position. FIG. 4 shows a simplified block diagram of the cross-sectional view of the emergency deployment system 310 of FIG. 3 still in a primed state and cooperated with a primary landing gear drive system 110, with the primary landing gear drive system in the extended or deployed position. The deployment of the landing gear without having to activate the emergency deployment system is sometimes referred to as a normal extend operation.

Referring to FIGS. 3-4, the landing gear coupler 312 or linkage is configured to couple with the landing gear 116 (see FIG. 1) of the airplane within which the landing gear system is positioned. In some embodiments, the release link 314 is configured to maintain the emergency deployment system in the primed state and ready to be activated to deploy the landing gear 116 independent of the primary actuator 112 and drive shaft 114. Further, the release link 314 is configured to cooperate the landing gear coupler 312 with the drive shaft 114. In some embodiments, the release link 314 couples with the landing gear coupler 312, and when implemented with a primary landing gear drive system 110, is configured to releasably cooperate the landing gear coupler 312 with the drive shaft 114 of a landing gear system. In some embodiments, the release link allows the landing gear coupler 312 to transfer the drive force from the drive shaft 114 to the landing gear 116 in response to the movement of the drive shaft. Further, in some implementations, the drive forces are transferred through the release link 314.

As shown in FIG. 4, in some embodiments, at least the landing gear coupler 312 is configured to move in cooperation with the movement of the drive shaft 114 during normal and intended operation of the primary landing gear drive system 110. The landing gear coupler 312 coupled with the landing gear 116 (see FIGS. 1-2) such that the landing gear is deployed and retracted as the landing gear coupler is moved. The landing gear coupler 312 can be substantially any type of coupler, linkage, engager or the like configured to cooperate the landing gear 116 with the landing gear drive system 110 and/or emergency deployment system. For example, the landing gear coupler 312, in some embodiments, comprises a bolt, latch, end eye, clamp, link and pin, ring bearing and bolt, or other such coupler or combination of such couplers. The release link 314 is further configured to allow the emergency deployment system 310 to disengage and/or release the landing gear coupler 312 from the drive shaft 114 to allow for an emergency or override deployment of the landing gear, such as in response to a malfunction, error or failure of some or all of the primary landing gear drive system 110.

Figure 5:
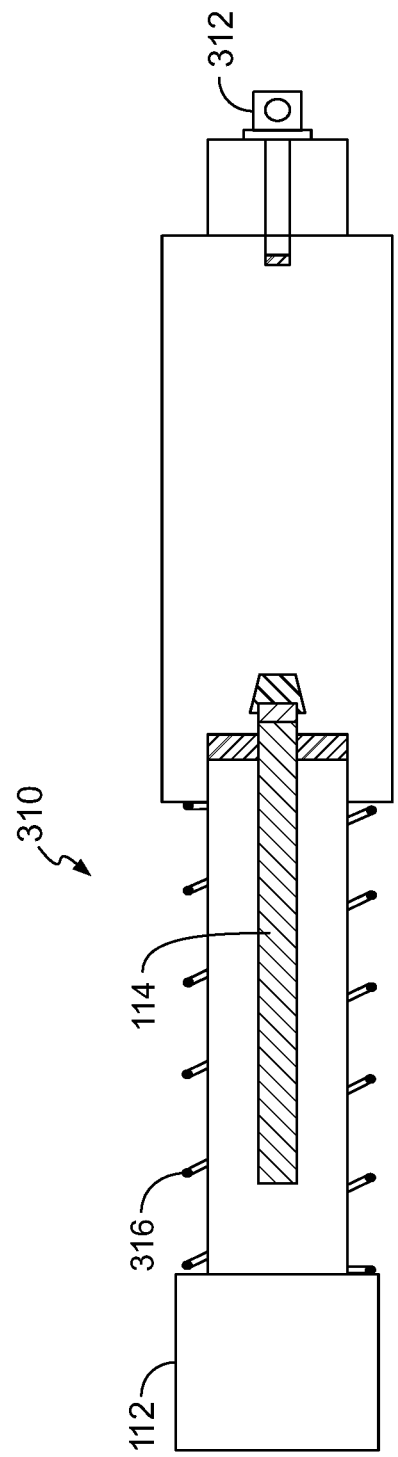
FIG. 5 shows a simplified block diagram of a cross-sectional view of the emergency deployment system in an actuated or triggered state and cooperated with the primary landing gear drive system, in accordance with some embodiments.

FIG. 5 shows a simplified block diagram of a cross-sectional view of the emergency deployment system 310 in an actuated or triggered state and cooperated with the primary landing gear drive system 110, in accordance with some embodiments. The deployment of the landing gear through the activation of the emergency deployment system is sometimes referred to as an emergency extend operation. In the actuated state, the emergency deployment system is actuated to deploy the landing gear independent of the primary landing gear drive system 110. Referring to FIGS. 3-5, in some embodiments, the override driver 316 is cooperated with the landing gear coupler 312 and is positioned relative to the landing gear coupler to induce a force to drive the landing gear coupler 312 at least in a direction to cause the landing gear 116 to transition to the deployed position.

In some embodiments, the release link 314 releasably cooperates the landing gear coupler 312 with the drive shaft 114. As described above, when the primary landing gear drive system 110 is operating as intended and the primary actuator 112 is capable of effectively moving the drive shaft 114, the release link 314 maintains a relative position of the landing gear coupler 312 relative to the drive shaft 114. Accordingly, when the drive shaft moves between the stowed and deployed positions the landing gear coupler 312 transfers the movement of the drive shaft 114 to the landing gear 116 to effectively deploy and stow the landing gear.

When there is an error, malfunction or other problem inhibiting the effective movement of the drive shaft 114 during normal operation, the emergency deployment system 310 can be activated to force the deployment of the landing gear independent of the primary actuator 112 and drive shaft 114. The release link 314 is configured to release or disengage the coupling between the drive shaft 114 and the landing gear coupler 312, and the override driver 316 is configured to drive the landing gear coupler 312 to the deployed position independent of the drive shaft 114. In some embodiments, the trigger and/or control circuitry 318 actuates the release link 314 to disengage or release the coupling such that the landing gear coupler 312 moves independent of the drive shaft and is configured to drive the landing gear to the deployed position without the drive shaft.

In some implementations, override driver 316 comprises one or more springs or other such devices storing a potential energy, and the disengagement of the release link causes a release of the potential energy stored by the override driver 316. Accordingly, the emergency deployment system 310 is configured to deploy the landing gear 116 when a problem occurs with the primary actuator 112 and/or drive shaft 114 that inhibits the primary landing gear drive system from deploying and/or fully deploying the landing gear 116 to a deployed position or at least a sufficiently deployed position where the landing gear can effectively contact the landing surface (e.g., runway) and support the weight of the airplane while avoiding or limiting contact of the fuselage of the airplane from contacting the landing surface.

Again, in some embodiments, the release link 314 is configured to maintain a relative position of the landing gear coupler 312 relative to the drive shaft 114 while the primary landing gear drive system 110 is operating as intended, and to disengage the coupling to allow the landing gear coupler to move at least in the direction to deploy the landing gear 116 independent of the drive shaft 114, such as in response to an error condition or malfunction.

The release link 314 can be substantially any releasable coupling that is configured to maintain a relative position of the landing gear coupler 312 relative to the drive shaft 114 during normal and intended operation of the landing gear and further configured to disengage the coupling such that the landing gear coupler 312 can move independent of the drive shaft 114. For example, in some embodiments, the release link 314 comprises a small, localized and/or directed explosive that upon detonation causes a break of at least a portion of the release link resulting in the disengagement between the landing gear coupler and the drive shaft. In some implementations the release link 314 includes an explosive bolt that comprises a small explosive that when detonated causes the bolt to break, typically at a predefined location along a length of the bolt, and in some instances at a weakened location along a length of the bolt. The breaking of the bolt disengages the landing gear coupler 312 from the drive shaft 114.

Other devices and/or systems can be employed as the release link, such as but not limited to a Frangibolt with designed weak point together with shape memory material that heats up and expands to break the Frangibolt, split spool, pressure fit system, and other such devices or systems. For example, in some embodiments, the release link comprises a split spool having two halves that cooperate to span and maintain a positional relationship between two pins, bolts or the like. A wire is wound around the split spool keeping the two halves together. A current can be applied to the wire that can cause the wire to fail, which allows the wire to unwind such that the two halves of the split spool separate and the two pins are allows to separate. Other embodiments may employ a pneumatic pressure system where one or more balls, cylinders or other such structures that maintain the structure of the release link. A pressure can be applied (e.g., pneumatic pressure) to move a portion of the system aligning one or more holes or detents with one or more balls, cylinders or the like. Upon alignment, the balls move into the holes allowing one or more parts of the release link to separate resulting in disengagement. Other such systems, devices and/or combinations can be used to implement the release link.

The override driver 316 is configured to drive the landing gear coupler 312 at least to the deployed position independent of movement or non-movement of the drive shaft 114. In some in embodiments, the override driver 316 is a spring that stores potential energy. Once the release link 314 is activated it causes a decoupling between the landing gear coupler 312 and the drive shaft 114, and the override driver can be activated to drive the landing gear coupling. In some embodiments, the disengagement by the release link activates the override driver 316. For example, in some implementations, the override driver 316 comprises one or more springs that are at least partially compressed and once the release link disengages the coupling between the landing gear coupler 312 and the drive shaft 114 the one or more springs expand forcing the landing gear coupler 312 to the deployed or extended position. The override driver 316 can include one or more types of driver systems, such as but not limited to one or more springs, compressed gas, pneumatic fluid, explosive, and other such drivers or drive systems, or combinations of such drivers or drive systems.

The emergency deployment system 310 can be implemented with substantially any relevant landing gear system 110. In many embodiments, the emergency deployment system is cooperated with an electro-mechanical landing gear system; however, in other embodiments the emergency deployment system may be cooperated with other types of landing gear systems include hydraulically actuated landing gear systems and/or other systems. Further, the emergency deployment system 310 is typically implemented with linearly actuated landing gear systems and/or landing gear systems that allow decoupling by the release link while allowing the override driver to deploy the landing gear.

Figure 6:
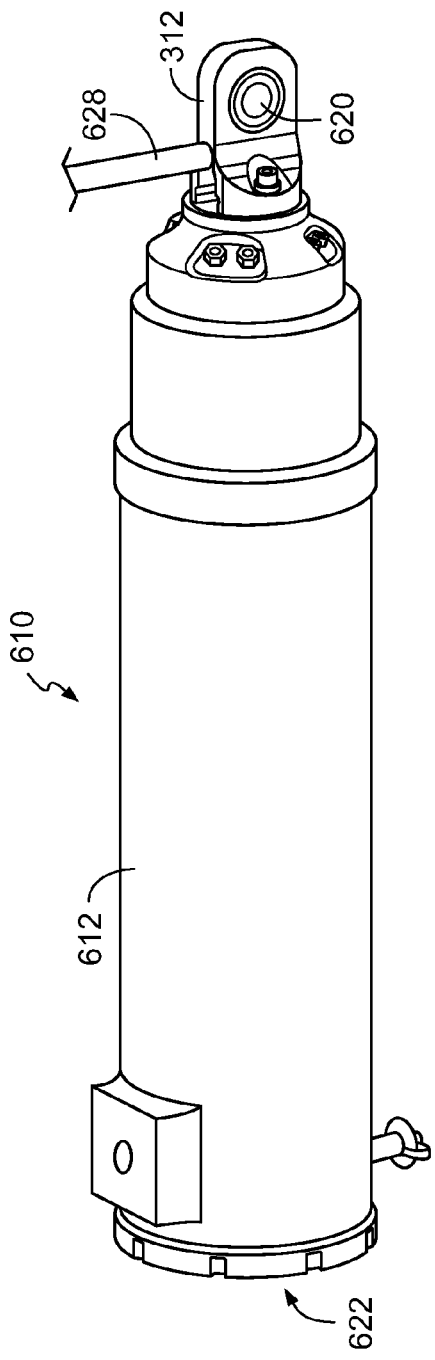
FIG. 6 illustrates a perspective view of an emergency deployment system in a primed state, in accordance with some embodiments.
Figure 7:
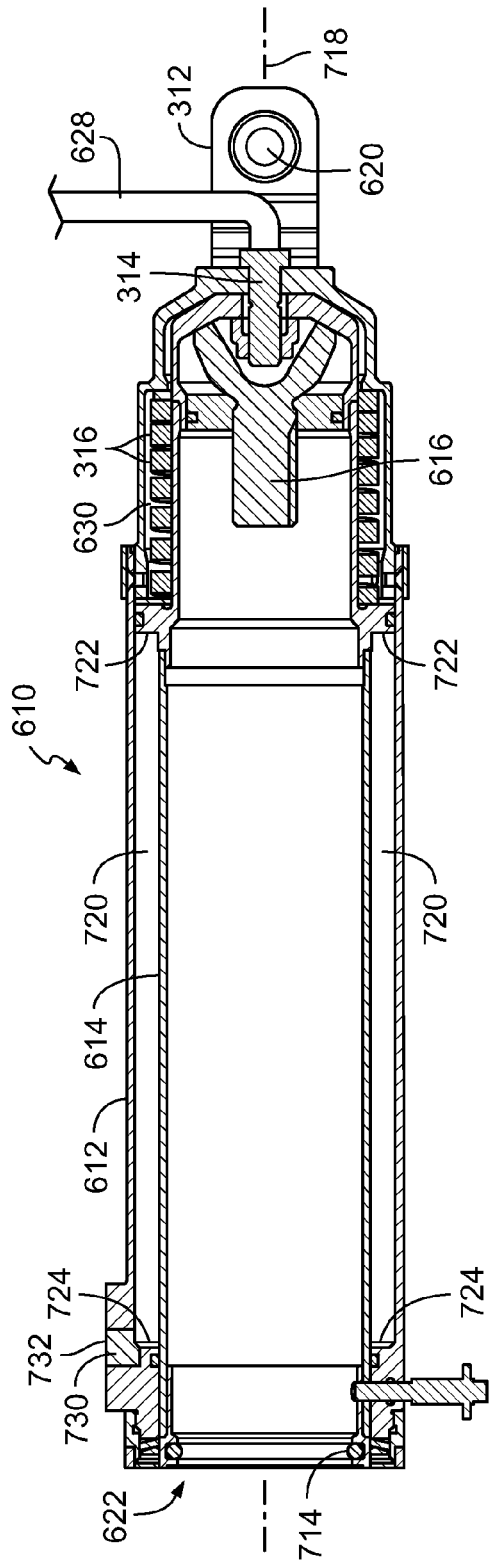
FIG. 7 illustrates a cross-sectional view of the emergency deployment system of FIG. 6 in the primed state, in accordance with some embodiments.
Figure 8:
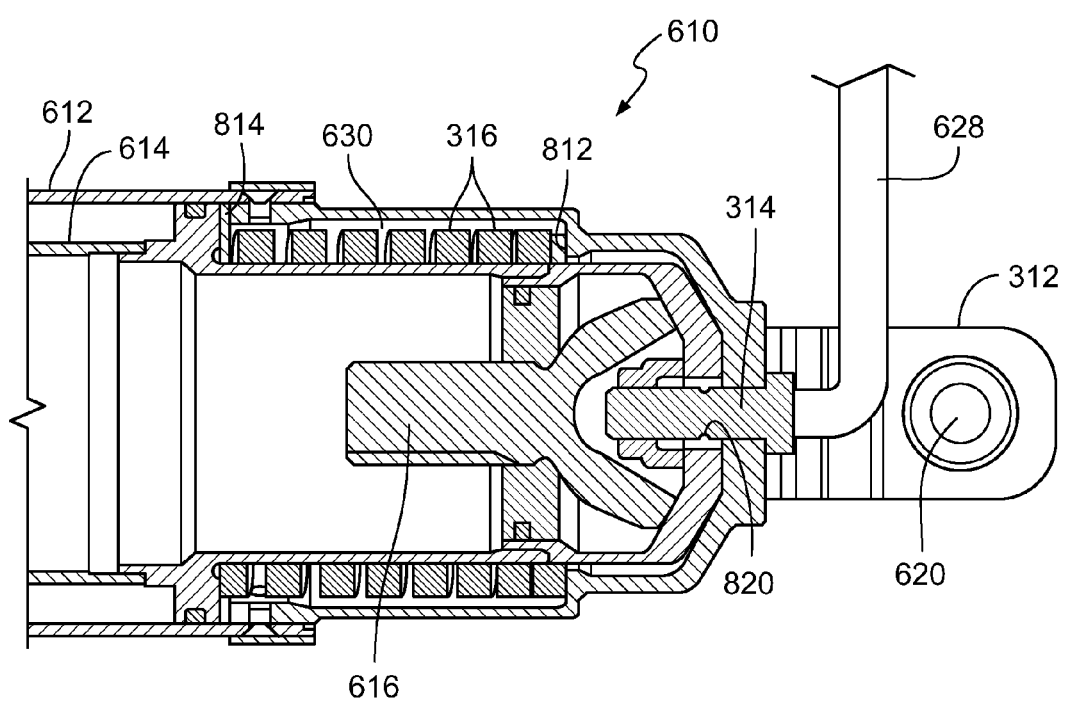
FIG. 8 shows an enlarged, cross-sectional view of a portion of the emergency deployment system depicted in FIG. 7.

FIG. 6 illustrates a perspective view of a landing gear emergency deployment system 610 in a primed state, in accordance with some embodiments. FIG. 7 illustrates a cross-sectional view of the emergency deployment system 610 of FIG. 6 in the primed state, in accordance with some embodiments. In some embodiments, the emergency deployment system 610 comprises a landing gear coupler 312, a release link 314, the override driver 316, an exterior casing or sleeve 612, an interior casing or sleeve 614 and a drive shaft connector 616 or servo end fitting. FIG. 8 shows an enlarged, cross-sectional view of a portion of the emergency deployment system 610 depicted in FIG. 7 and showing a cooperation between the exterior casing 612 and the interior casing 614 proximate the landing gear coupler 312 while in the primed state, in accordance with some embodiments.

Referring to FIGS. 6-8, in some embodiments, the landing gear coupler 312 is part of or is secured with the exterior casing 612 and extends from the exterior casing. Further, the landing gear coupler 312 includes a coupling aperture, clasp, hook, bolt or other such structure or combinations of such structures (referred to below for simplicity as a coupling aperture 620) configured to secure with a portion of the landing gear to transfer drive forces to the landing gear in moving the landing gear between the deployed position and the retracted or stowed position. For example, in some embodiments the landing gear coupler 312 comprises an extended post, protrusion, plinth or the like extending from the exterior casing 612 and in which is formed the coupling aperture 620 or with which the coupling aperture is secured.

The exterior casing 612 extends away from the landing gear coupler 312. In some embodiments, the interior casing 614 is positioned adjacent the exterior casing and in some implementations at least partially within the exterior casing 612. The exterior casing 612 and interior casing 614 are depicted in FIGS. 6 and 7 as being cylindrical. It will be appreciated by those skilled in the art that the exterior and interior casings can have substantially any relevant shape that cooperates with the primary landing gear drive system 110 (e.g., square cross-section, triangular cross-section, rectangular cross-section, octagonal cross-section, etc.). The interior casing, in at least some implementations, is inserted through a receiving end 622 or orifice and into an interior chamber or cavity formed by the walls of the exterior casing 612 to be at least partially positioned within the interior chamber at least while the emergency deployment system is in the primed state.

In some embodiments, the release link 314 releasably secures the exterior casing 612 with the interior casing 614. For example, in some instances, the release link 314 comprises an explosive bolt that extends from an exterior of the exterior casing 612 to an interior of the interior casing 614. Some implementations include a nut, pin or other structure that mates with the exploding bolt, while in other instances, the exploding bolt may threadedly secure with mating threads of the interior casing 614. As described above, other release links can be employed in some implementations. The release link 314, in some embodiments, is configured to at least in part maintain a position of the exterior casing 612 relative to the interior casing 614. Further, in many embodiments, the interior casing 614 is positioned to be coaxially aligned with the exterior casing 612, with a coupling end of the interior casing being secured proximate a coupling end of the exterior casing, while an open or receiving end 622 may be open and configured to receive at least a portion of the drive shaft 114 of the primary landing gear drive system 110. Similarly, in some implementations, the interior casing and the exterior casing are positioned about at least a portion of a length of and are coaxially aligned with the drive shaft 114, and linearly move substantially parallel with and typically along an axis 718 of the drive shaft between the stowed and deployed positions.

In some embodiments, the drive shaft connector 616 is coupled with the interior casing 614 and is configured to further couple with the drive shaft 114 (not depicted in FIGS. 6-7). The drive shaft connector 616 is secured with interior casing 614 through one or more bolts, pins, rivets, threading or other such methods or combinations of such methods. For example, the drive shaft connector 616 may be threadedly secured directly with mating threads formed in the interior casing or a threading otherwise secured with the interior casing and/or the release link 314.

The drive shaft connector 616 is further configured to couple with the drive shaft 114, securing the interior casing with the drive shaft, and transfer the drive force from the drive shaft to the landing gear coupler 312. In some implementations, the drive shaft connector 616 couples with the drive shaft through threading, one or more pins, one or more bolts and/or other such coupling. For example, the drive shaft connector 616, in some implementations, may include threading that threaded engages the drive shaft 114 or a coupling attachment that secures the drive shaft connector 616 with the drive shaft. Additionally or alternatively, the drive shaft connector may extend at least partially around the drive shaft or a coupling attachment (or fit within the drive shaft or coupling attachment) and/or a pin, bolt or the like may extend through some or all of the drive shaft connector and into or through the drive shaft. In other embodiments, the drive shaft connector 616 is not included and the drive shaft 114 couples directly with the release link 314, the interior casing 614 or other structure of the emergency deployment system.

In some embodiments, the override driver 316 is positioned between the exterior casing 612 and the interior casing 614. For example, a region between the exterior casing and the interior casing can define an override driver cavity 630 within which the override driver is positioned. In some implementations, the exterior casing includes one or more ledges 812, shoulders, walls or other such structure at one end of the override driver cavity 630, and the interior casing includes one or more ledges 814, shoulders, walls or other such structure at an opposing end of the override driver cavity 630. In some embodiments, the override driver comprises one or more springs. At least one spring can be positioned within the override driver cavity 630 with the spring positioned between the ledge 812 of the exterior casing and the ledge 814 of the interior casing. In some implementations, the exterior casing ledge and the interior casing ledge maintain the spring in a compressed state while the emergency deployment system 610 is in the primed state and not activated such that the release link 314 is engaged and maintaining the position of the exterior casing 612 relative to the interior casing 614. Accordingly, the release link 314 maintains the potential energy provided through the compression of the spring while the release link 314 is engaged and maintaining the position of the exterior casing relative to the interior casing.

The exterior casing ledge 812, in some implementations, protrudes from an the interior wall of the exterior casing and extends toward a central axis of the exterior casing to in part maintain a position of the override drive spring and upon which the spring exerts force on the exterior casing 612. Further, in some embodiments, the exterior casing ledge 812 may extend around a circumference of an interior of the exterior casing. The interior casing ledge 814, in some embodiments, protrudes from an exterior of the interior casing and extends away from a central axis of the interior casing to in part maintain a position of the override drive spring and from which the spring exerts force on the exterior casing 612, at least after the release link has disengaged. Further, in some embodiments, the interior casing ledge 814 extends around the exterior circumference of the interior casing 614. Accordingly, the override drive spring, in some implementations, is positioned about the interior casing between the interior casing and the exterior casing, and between the exterior casing ledge(s) 812 and the interior casing ledge(s) 814. The one or more drive springs can be substantially any relevant spring configured to provide sufficient force to deploy the landing gear. For example, in some embodiments the drive spring is a compression spring formed of titanium, steel alloy, or other such relevant material or combinations of such materials. Upon decoupling of the exterior casing from the interior casing, the override driver, in some embodiments, applies a force to the exterior casing and moves the exterior casing and the landing gear coupler to the deployed position effectively duplicating the results that would have otherwise been performed by the primary actuator 112.

Some embodiments further comprise the control circuitry 318 that activates or triggers the release link to disengage causing the decoupling between the landing gear coupler 312 and the drive shaft 114. As described above, some embodiments include an explosive bolt as at least part of the release link. The control circuitry can couple with the release link through a conductor 628, wiring or the like. The control circuitry can cause a signal, a current of a threshold level, a voltage or other such activation to be delivered to the release link. For example, a current above a threshold level can be applied to an explosive bolt to ignite or otherwise trigger the explosive to detonate causing the bolt to break (e.g., at a weakened point 820). The signal, trigger or the like causes the release link 314 to disengage the coupling between the drive shaft 114 and the landing gear coupler 312 such that the landing gear coupler is configured to move at least toward the deployment position independent of the primary actuator 112 and drive shaft 114. In some embodiments, the landing gear coupler 312 and/or other structure (e.g., cooperated with the exterior casing) provides a least some protection for the release link 314 and/or the conductor 628.

FIG. 9 illustrates a simplified, cross-sectional view of the emergency deployment system 610 of FIGS. 6-8 in the primed state and cooperated with a primary landing gear drive system 110, in accordance with some embodiments, with the primary landing gear drive system in the retracted or stowed position. FIG. 10 illustrates a simplified, cross-sectional view of the emergency deployment system 610 of FIGS. 6-9 cooperated with a primary landing gear drive system 110, in accordance with some embodiments, with the primary landing gear drive system in the extended or deployed position.

Referring to FIGS. 9-10, as described above, in some implementations, the interior casing 614 is configured to cooperate with and receive at least a portion of the drive shaft 114. Further, in some embodiments, the interior casing has dimensions to receive a drive shaft housing 914 or containment sleeve that surrounds the drive shaft 114 and extends along at least a portion of a length of the drive shaft, at least when the drive shaft is in a retracted or stowed position. Still further, in some embodiments, the receiving end 622 of the interior casing comprises an aperture that has dimensions that are substantially the same as an outer dimension of the drive shaft housing 914.

With the emergency deployment system 610 fixed with the drive shaft 114, in some embodiments, drive shaft 114 and drive shaft housing 914 at least partially extend through the receiving end 622 and into an interior cavity defined by the interior casing. Further, in some implementations, the interior casing 614 establish a seal with the exterior of the drive shaft housing 914, for example through one or more gaskets, O-rings 714 (sec FIG. 7) or other such structure. In some embodiments, during normal and intended operation of the primary landing gear drive system 110, the emergency deployment system 610 is configured to move as the drive shaft is transitioned between the stowed and deployed positions, and in some instances, along at least a portion of a length 1012 of the drive shaft housing 914. Further, in operation in accordance with some embodiments, the force exerted by the drive shaft 114 is transferred through the drive shaft connector 616 and the landing gear coupler 312 to the landing gear 116. In some implementations, the force from the drive shaft 114 is further transferred at least in part through one or more of the release link 314, interior casing 614 and exterior casing 612 to the landing gear 116.

Accordingly, in some embodiments, the interior casing 314 and exterior casing 612 are configured with dimensions to receive the drive shaft housing 914 of the primary landing gear drive system. Still further, in some implementations, the exterior and interior casings 612, 614 are configured with dimensions that are similar to those of the primary actuator 112 such that the exterior and interior casings 612, 614 do not significantly add to the dimensions of the overall primary landing gear drive system, and in some implementations can be retrofitted with existing linear landing gear drive systems. For example, an outer diameter 920 of the exterior casing 612 is similar to a width and/or height 922 in accordance with some embodiments. Further, in some embodiments, the cavity defined by an interior of the interior casing 614 has a length that, in some embodiments, is about equal to or greater than a length of the drive shaft housing 914.

As described above, when a malfunction or other problem is detected where the landing gear 116 is not deployed and/or is not fully deployed, the emergency deployment system can be activated and the release link 314 trigged to release the coupling such that the landing gear coupler 312 is configured to move independent of the drive shaft 114. In some embodiments, the disengagement by the release link is associated with the activation and/or of the override driver 316 that drives the exterior casing 612 and landing gear coupler 312 to transition the landing gear to the deployed position. Typically, the exterior casing and landing gear coupler are moved along the same path that the drive shaft would otherwise drive the landing gear coupler had the primary landing gear drive system been operating correctly to fully deploy the landing gear.

FIG. 11 shows a plane view of an emergency deployment system 310, in accordance with some embodiments, in the actuated state and after the override driver 316 has been released to drive the landing gear coupler 312 to the deployed position. FIG. 12 shows a simplified cross-sectional view of the emergency deployment system 310, in accordance with some embodiments, after the override driver 316 has been activated to drive the landing gear coupler 312 to the deployed position. In driving the landing gear coupler 312 to the deployed position, the exterior casing 612 travels along a portion of a length of the interior casing 614, and typically greater than half the length of the interior casing; however, the distance of travel of the exterior casing is dependent on the dimensions of the primary landing gear drive system 110, the emergency deployment system, the movement of the landing gear 116 and other such factors. As such, the emergency deployment system 610 is configured, in at least some embodiments, to linearly move the landing gear coupler 312 at least a sufficient distance when the primary landing gear drive system 110 is in the stowed position to fully extend the landing gear to the deployed position. Thus, the emergency deployment system, in at least some embodiments, provides fully redundant landing gear deployment capabilities to the airplane.

As described above, in some embodiments, the override driver 316 comprises one or more springs positioned with the override driver cavity 630. Upon release, the spring expands, in some embodiments, driving the landing gear coupler to the deployed position while pressing between the first ledge 812 of the exterior casing 612 and the second ledge of the interior casing 614 causing a separation of a first end of the exterior casing that is proximate the landing gear coupler from the first end of the interior casing. The interior casing 614 typically continues to be secured with the drive shaft 114, such as through the drive shaft connector 616, and thus typically only moved a distance that the drive shaft allows. The exterior casing 612 and the landing gear coupler 312, however, move independent of the drive shaft.

In other embodiments, the interior casing 614 is configured to move relative to the exterior casing 612 in response to the disengagement of one or more release links. For example, the exterior casing may be fixed to the drive shaft housing 914, the primary actuator 112, the drive shaft 114 or other structure. The disengagement by the release link can allow the exterior casing cooperated and the landing gear coupler to be driven by one or more override drivers to transition to the deployed position.

Referring back to FIG. 7, some embodiments further attempt to dampen the drive force of the override driver 316 to limit and/or avoid the landing gear being driven into the deployed position with a force that may cause damage to the landing gear, landing gear supports and/or couplings, and/or the airplane. Accordingly, some embodiments are configured to include one or more deployment dampers, brakes, checks, force lesseners, or the like that is/are configured to limit speed at which the landing gear coupler moves when driven by the override driver and/or limit or reduce a force applied when the emergency deployment system is actuated. The damper can include one or more springs, hydraulics, pressure, and/or other such devices or systems to reduce, distribute and/or partially control the drive force.

In some embodiments, the emergency deployment system includes a damper or brake system comprising a chamber 720 that contains a gas, fluid or other such material. The chamber 720 typically is defined between an inner wall of the exterior casing 612 and an exterior wall of the interior casing 614 along a portion of the length of the interior casing. Further, the chamber 720 can extend a portion of or completely around a periphery of the interior casing. One or more seals 722, 724 (e.g., through one or more O-rings, gaskets, compression fit, etc.) are established to maintain the gas, fluid etc. within the chamber while the exterior casing 612 is maintained in a position relative to the interior casing 614. Typically, the seals are positioned on opposing ends of the chamber 720.

Further, in some embodiments, the emergency deployment system 610 further includes one or more fluid or gas discharge ports 730 cooperated with the chamber 720. In some embodiments, as the exterior casing moves relative to the interior casing 614 and toward the deployed position, a volume of the chamber is reduced and a pressure within the chamber increases. Typically, the discharge port 730 includes a rupturable seal 732, spring or otherwise biased seal or other seal that is overcome once pressure on the seal exceeds a pressure threshold. As such, at least a portion of the fluid and/or gas within the chamber 720 may be released through the discharge port 730 once the pressure within the chamber meets or exceeds the pressure threshold of the seal. Some embodiments further include a reservoir, tank or the like (not shown) that is directly coupled with or coupled through one or more conduits, hoses, etc. with the discharge port 730 to receive the fluid and/or gas released from the chamber.

Figure 13:
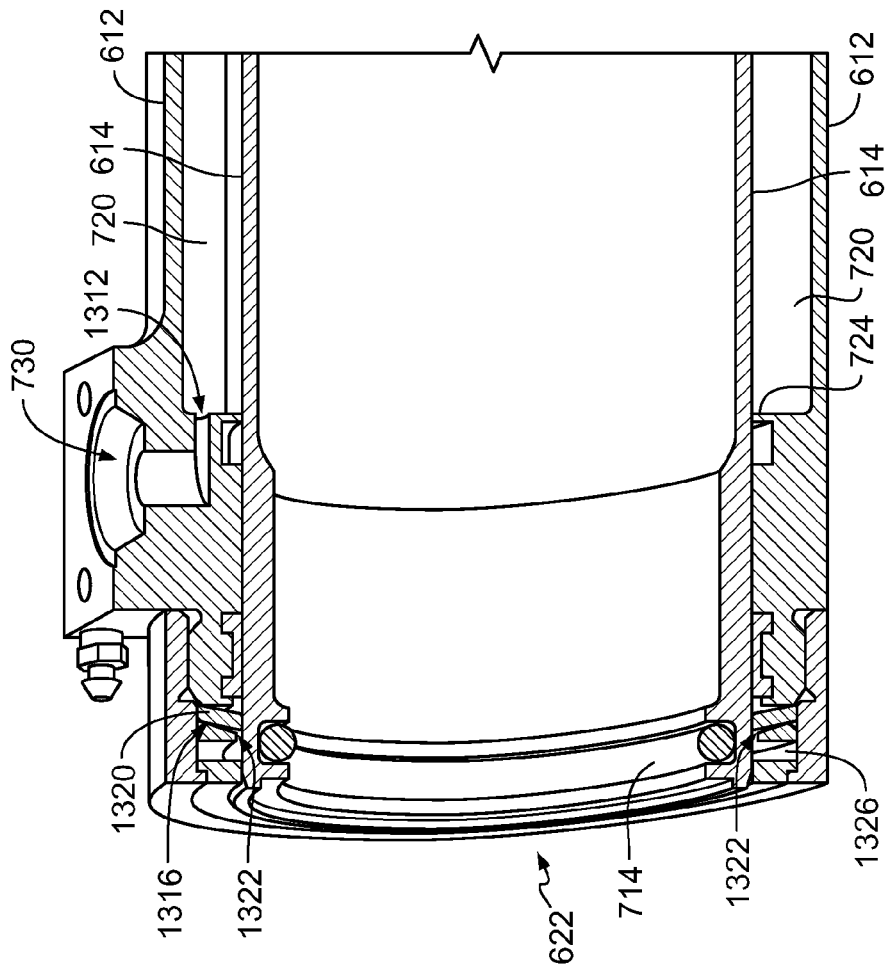
FIG. 13 shows an enlarged, partial cross-sectional view of a receiving end of an emergency deployment system, in accordance with some embodiments.

FIG. 13 shows an enlarged, partial cross-sectional view of the receiving end 622 of the emergency deployment system 610, in accordance with some embodiments. A portion of the chamber 720 is depicted in FIG. 13, while also illustrating a cooperation of the discharge port 730 with the cavity, such as through one or more discharge conduits 1312, channels, orifices or other such passages. Also illustrated, is a seal 724 around an exterior circumference of the interior casing 614 with the exterior casing 612, in accordance with some embodiments, defining an end of the chamber 720 and proximate the discharge port. As introduced above, some embodiments include a rupture disc or other structure cooperated with the discharge port 730 to keep the fluid or gas within the chamber 720 prior to the activation of the emergency deployment system 610.

In some embodiments, the emergency deployment system 610 further includes a locking or braking system 1316. The locking system is configured to readily slide along an exterior surface of the interior casing 614 as the exterior casing 612 moves relative to the interior casing in response to the release link disengaging. The locking system 1316 is further configured to inhibit or prevent movement of the exterior casing 612 from being forced in an opposite direction away from the deployed position and toward the stowed position (e.g., causing a compression of the spring of the override driver 316), such as when force is applied to the landing gear coupler 312 by the landing gear contacting the landing surface. In many embodiments, the spring of the override driver 316 has a force sufficient to cause the landing gear to deploy. Typically, however, the spring of the override driver 316 provides insufficient force to compensate for forces applied when the landing gear contacts the landing surface and supports the airplane as the airplane is landing. Accordingly, some embodiments include the locking system 1316 to inhibit movement of the exterior casing and/or landing gear coupler 312 in a direction away from the deployed position once the release link has disengaged and the override driver 316 has moved the landing gear coupler toward and/or to the deployed position.

For example, the locking system 1316 includes, in some embodiments, one or more levers 1320, ratchets, posts, rings, brakes, or the like positioned to allow movement of the exterior casing 612 in a first direction (i.e., in a direction toward the deployment position) while resisting movement in the opposite direction. In some implementations, the lever 1320 includes an edge 1322, corner, one or more teeth or the like configured to contact the exterior surface of the interior casing 614. The edge is positioned and configured to readily slides along the exterior surface of the interior casing 614 when the exterior casing 612 is moving in the direction toward the deployed position, while digging into the exterior surface should a force be applied to the exterior casing in a direction the is away from the deployed position (i.e., toward the stowed position). In some embodiments, the lever is biased with a surface leading to the edge 1322 at the angle to the exterior surface of the interior casing and at least partially pivots or compresses against the bias when force is applied to the exterior casing in the direction toward the stowed position. Further, in some embodiments, the locking system 1316 comprises a ring structure, with the lever 1320 having a ring shape and incorporated as at least part of a locking ring that is cooperated with the exterior casing and positioned about the interior casing. The edge 1322 is configured to contact at least a portion of an exterior surface of the interior casing, wherein the locking ring readily allows movement between the exterior casing and the interior casing in the direction toward the deployment position, when the landing gear coupler is moving relative to the interior casing to the deployed position, and resists movement of the exterior casing relative to the interior casing in in a direction away from and opposite to the direction toward the deployed position.

In some embodiments, the exterior casing includes one or more recesses, grooves 1326 or other such structure into which the one or more levers are positioned. For example, in some implementations, the exterior casing comprises an annular groove 1326 formed in and extending around an interior wall of the exterior casing. The locking ring is positioned within the annular groove 1326 with the edge 1322 positioned to extend beyond the surface of the interior wall such that the edge can contact the exterior surface of the interior casing 614 when the interior casing is cooperated with the exterior casing. Some embodiments include one or more springs, wave springs, or other such structure that applies a force on and/or otherwise biases the locking ring such that the edge 1322 continues to contact the interior casing. In some implementations, the wave spring is positioned within the annular groove 1326 with the locking ring.

Figure 14:
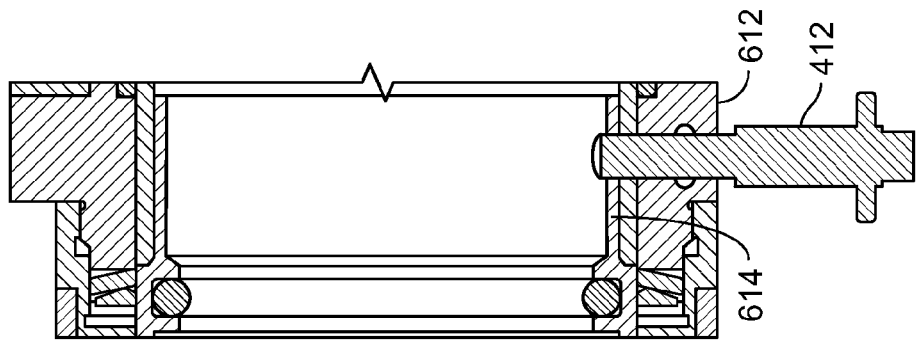
FIG. 14 shows a simplified, partial cross-sectional view of an emergency deployment system proximate a receiving end, in accordance with some embodiments.

FIG. 14 shows a simplified, partial cross-sectional view of the emergency deployment system 610 proximate the receiving end 622, in accordance with some embodiments. The emergency deployment system, in some embodiments, further includes one or more safety pins or locks 1412 that, when engaged, prevents the exterior casing 612 from moving relative to the interior casing 614 regardless of whether the release link 314 is engaged or disengaged. Accordingly, the safety pin 1412 prevents unintended movement of the exterior casing and/or deployment. This can be particularly advantageous during transport, installation and/or maintenance on the emergency deployment system 610. Further, the safety pin 1412 may be engaged to prevent movement of the exterior casing when the airplane upon which the emergency deployment system is mounted is on the ground and not in use.

In some embodiments, the safety pin 1412 is positioned to extend through an aperture in each of exterior casing 612 and the interior casing 614 when the safety pin is engaged to prevent movement of the exterior casing relative to the interior casing. Further, the safety pin may include one or more latching pegs or posts that extend laterally from the sides of the pin to engage locking grooves in one or both of the exterior and/or interior casings to secure the safety pin in the engaged position. Further, in some implementations, the safety pin maybe spring biased to maintain its position extending through both the interior and exterior casings when engaged. The safety pin may be fully removed from the emergency deployment system when disengaged, or removed at least from the aperture in the interior casing (e.g., the pin is locked, such as through a rotation into the disengaged position). Typically, should the release link 314 disengage and release the exterior casing while the safety pin 1412 is engaged, the pressure applied by the override driver 316 pinches the safety pin between opposing sides of the apertures of the exterior casing and the interior casing establishing a force on the safety pin that prevents the safety pin from being removed while the safety pin prevents the exterior casing from movement at least relative to the interior casing.

Figure 15:
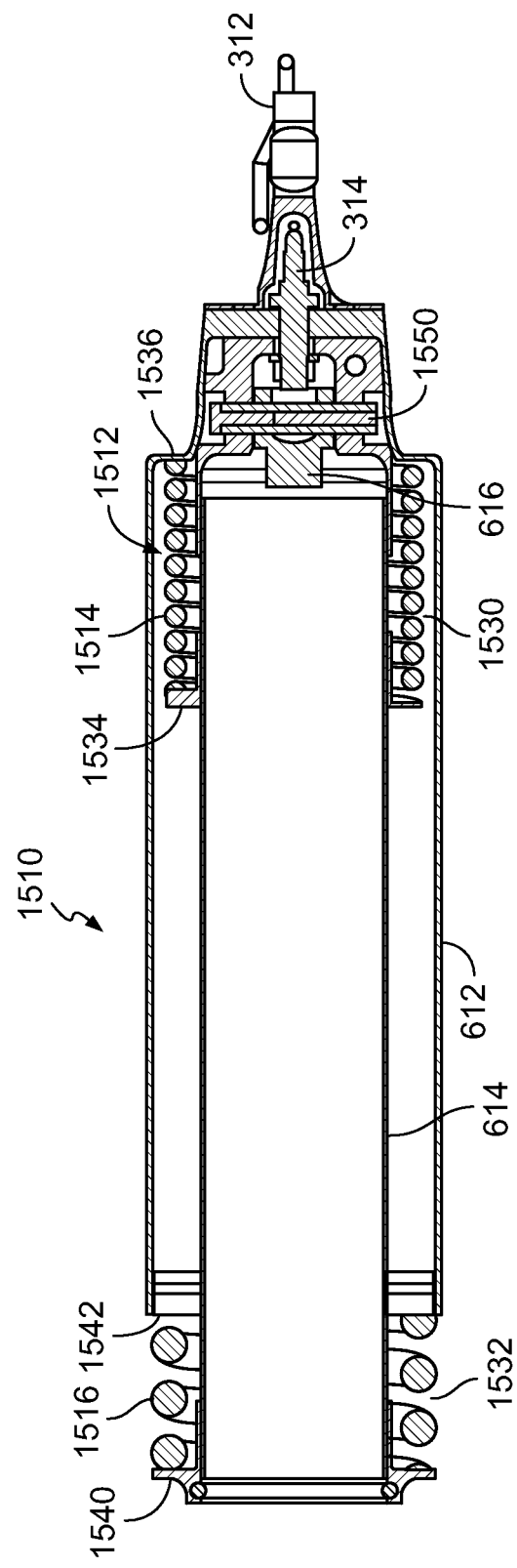
FIG. 15 shows a simplified, cross-section view of an emergency deployment system in a primed state, in accordance with some embodiments.

FIG. 15 shows a simplified, cross-section view of an emergency deployment system 1510 in a primed state, in accordance with some embodiments. The emergency deployment system 1510 includes an override driver 1512 that comprises a first or primary override driver spring 1514 and a second or secondary override driver spring 1516. The cooperation of the two springs allows the use of springs having different stiffnesses, and/or spring constantans, sometimes defined by the change in the force exerted divided by the change in deflection of the spring. For example, in some embodiments, the secondary override driver spring 1516 is a stiffer spring than the primary override driver spring 1514, and typically has an expanded or non-compressed length that is less than the non-compressed length of the primary override driver spring 1514. As such, the secondary override spring provides an initial larger force on the exterior casing 612 over a short range of motion, and in some embodiments over only a first portion of a distance traveled by the landing gear coupler when moving to the deployed position. The increased force can be used to, at least in part and in some implementations, overcome and/or force landing gear doors to open. The primary override driver spring 1514 continues to expand after the secondary override spring stops applying force to continue to drive the landing gear to the deployed and/or fully extended position, and thus, in some embodiments over at least a second portion of the distance traveled by the landing gear coupler when moving to the deployed position.

Some embodiment that include the multi-spring configuration include multiple override driver cavities 1530, 1532, recesses or the like in which the multiple override springs are positioned. For example, in the embodiment depicted in FIG. 15 the emergency deployment system 1510 includes a first override driver cavity 1530 into which the primary override driver spring 1514 is positioned and formed between the exterior casing 612 and the interior casing 614 and between a lip, ledge, shoulder 1534 or other such structure of the interior casing and a wall 1536, shoulder or other such structure of the exterior casing. Similarly, the second override driver recess 1532 receives the secondary override driver spring 1516 and is formed, in some embodiments between an shoulder 1540, ledge, lip or the like of the interior casing 614 and a shoulder, wall, ledge, end cap 1542 or other structure of the exterior casing 612.

In some embodiments, the exterior casing 612 and landing gear coupler 312 is releasably secured relative to the interior casing 614 through a release link 314, such as those described above. Further, in some embodiments, a drive shaft connector 616 is secured with the interior casing 614 through cross-pin 1550, bolt, rivet or other such structure.

FIG. 16 shows a simplified cross-sectional view of an emergency deployment system 1610 cooperated with a primary landing gear drive system 110, in accordance with some embodiments. In FIG. 16, the emergency deployment system is illustrated in a primed or unactuated state and in the stowed position. The emergency deployment system 1610 includes an exterior casing 612, and interior casing 614, a landing gear coupler 312, a release link 314 and an override driver 316. FIG. 17 shows a simplified cross-sectional view of the emergency deployment system 1610 of FIG. 16 cooperated with a primary landing gear drive system 110 and in an actuated or deployed state or position following the disengagement by the release link such that the landing gear coupler 312 is in the deployed position independent of the interior casing 614 and drive shaft 114, in accordance with some embodiments.

Referring to FIGS. 16-17, in some embodiments, the interior casing 614 has a length that is less than a length of the exterior casing 612. In some instances, the length of the interior casing may be half the length of the exterior casing, while in other implementations, the interior casing may be a third, two thirds, four fifth or other such lengths of the exterior casing. For example, the interior casing may be positioned fully within a cavity defined by the exterior casing when the release link has not been activated to release the coupling between the interior and exterior casings. Further, in some embodiments, the interior casing is not sealed with the exterior casing and does not provide a damper chamber or damper fluid or gas.

The override driver 316, in some embodiments, includes one or more override drive springs. In some implementations, the interior casing 614 includes one or more shoulders 1620, walls, ledges or other such structures against which an override drive spring is positioned. The interior casing shoulder 1620, in some embodiments, protrudes from the exterior of the interior casing and extends laterally away from a central axis of the interior casing to in part maintain a position of the override drive spring and from which the spring exerts pressure on the exterior casing 612, at least after the release link has disengaged. Further, in some embodiments, the shoulder 1620 extends around the exterior circumference of the interior casing 614. Similarly, in some implementations, the exterior casing 612 further includes one or more shoulders 1622, walls, ledges or other such structures against which the override drive spring is positioned. The exterior casing shoulder 1622, in some embodiments, protrudes from the interior wall of the exterior casing and extends laterally toward a central axis of the exterior casing to in part maintain a position of the override drive spring upon which the spring exerts pressure on the exterior casing 612. Further, in some embodiments, the exterior casing shoulder 1622 extends around the circumference of an interior of the exterior casing. As such, the override drive spring, in some implementations, is positioned about the interior casing between the interior casing and the exterior casing, and between the interior casing shoulder(s) 1620 and the exterior casing shoulder(s) 1622.

The activation of the emergency deployment system 1610 causes the release of the override drive spring to expand moving the landing gear coupler 312. The distance or amount of travel of the exterior casing 612 and/or landing gear coupler 312 is typically restricted by the landing gear 116 and the full deployment of the landing gear (e.g., a landing gear stop and/or locking mechanism). Accordingly, the override driver 316 is configured, in at least some embodiments, to linearly move the landing gear coupler 312 at least a sufficient distance when the emergency deployment system 1610 (and the primary landing gear drive system 110 is in the stowed position) to fully extend the landing gear to the deployed position.

Figure 18:
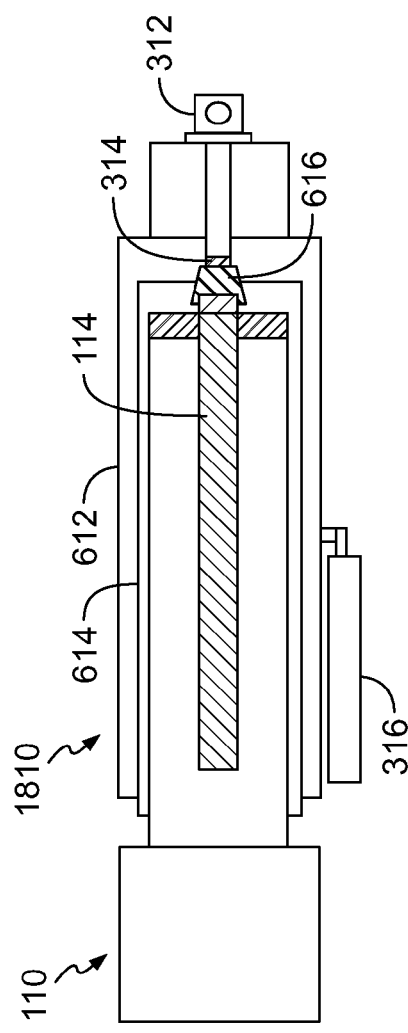
FIG. 18 depicts a simplified cross-sectional view of an emergency deployment system in a primed state and cooperated with a primary landing gear drive system, in accordance with some embodiments.
Figure 19:
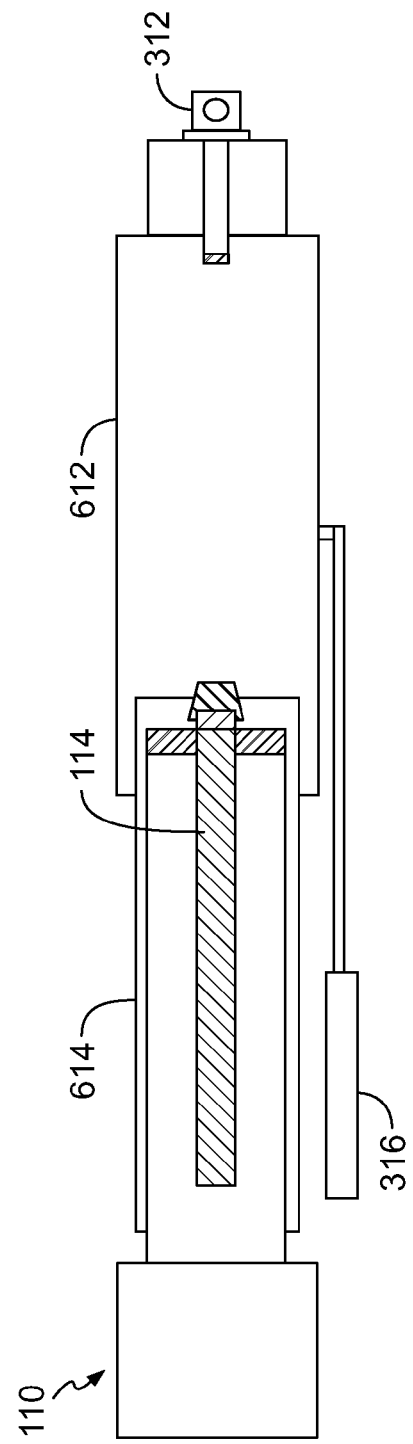
FIG. 19 depicts a simplified cross-sectional view of the emergency deployment system of FIG. 18 in an actuated and/or deployed state, in accordance with some embodiments.

FIG. 18 depicts a simplified cross-sectional view of an emergency deployment system 1810 in a primed state and cooperated with a primary landing gear drive system 110, in accordance with some embodiments. FIG. 19 depicts a simplified cross-sectional view of the emergency deployment system 1810 of FIG. 18 in an actuated and/or deployed state and/or position after having been activated, in accordance with some embodiments. The emergency deployment system 1810, in some embodiments, includes an exterior casing 612, an interior casing 614, one or more landing gear couplers 312, a release link 314, and an override driver 316.

Referring to FIGS. 18-19, the emergency deployment system 1810 is secured with the drive shaft 114 of the primary landing gear drive system 110 such that at least the landing gear coupler 312 moves in cooperation with the drive shaft while the emergency deployment system is in the primed state. The landing gear coupler 312 is configured to couple directly or indirectly with the landing gear 116 (not depicted in FIG. 18) to deploy and/or stow the landing gear in accordance with the operation of the primary landing gear drive system and/or the emergency deployment system.

In some embodiments, the interior casing 614 is secured with the drive shaft 114, for example, through a drive shaft connector 616. Further, the exterior casing 612 is configured to movably cooperate with the interior casing 614. In some embodiments, the exterior casing includes a receiving orifice or hole leading to an interior chamber and configured to receive at least a portion of the interior casing 614. Further, the orifice can be configured to create a seal about an exterior surface of the interior casing 614. The seal can be gas tight or relatively gas tight. In some implementation the seal is created through one or more gaskets, O-rings, washer, or other such sealings.

The release link 314 maintains the coupling between the drive shaft 114 and the landing gear coupler 312 when engaged. For example, in some implementations the release link secures the exterior casing with the drive shaft connector 616 that in turn is secured with the interior casing 614 and the drive shaft. In response to detecting a malfunction, the release link can be triggered to disengage the coupling between the exterior casing and the interior casing. Further, the override driver 316 can be activated. In some embodiments, the override driver 316 comprises one or more sources of gas and/or liquid and injects the gas and/or liquid into the interior chamber of the exterior casing 612 between the exterior casing and the interior casing 614 increasing a pressure within the chamber. The increased pressure drives the exterior casing 612 toward the deployed position. Some embodiments additionally include one or more locking systems or mechanisms that resist the movement of the exterior casing in a direction away from the deployed position, such as the locking system 1316, a ratchet and/or ratchet wheel, or other such locking system.

In some embodiments, the override driver 316 comprises one or more tanks or other such sources of compressed gas that couple with a port of the exterior casing. The compressed gas source releases the compressed gas through the port and into the interior chamber of the exterior casing. The tank or other source of compressed gas can be fixed with the exterior casing to move as the exterior casing moves, or can be coupled with the exterior casing through a conduit, hose or the like. As described above, the exterior casing 612 may cooperate with the interior casing to establish a seal or only provide a relatively small opening between the casings such that as the gas and/or fluid is injected into the chamber sufficient pressure is at least temporarily established to drive the exterior casing and landing gear coupler 312 to the deployed position independent of the drive shaft 114, the operation of the primary landing gear drive system 110 and/or the linear location of the drive shaft at the time a malfunction, failure or other error is detected.

The emergency deployment system can be utilized with substantially any relevant landing gear system and/or aircraft. Further, in many embodiments, the emergency deployment system is configured to be implemented with linear primary actuators (e.g., linear electromechanical actuator, linear hydraulic actuators, etc.) and/or other systems having a drive shaft that linearly moves in deploying landing gear. The emergency deployment system can be activated by a pilot, automated controller that receives feedback from one or more sensors, one or more control systems operated on the aircraft, one or more remote control systems, remote operator, other such controllers, or combinations thereof. In some implementations the emergency deployment system can be utilized in unmanned aircraft that are remotely controlled. Further, the emergency deployment system is often configured to fit within limited space with the landing gear. In many implementations, the emergency deployment system is cooperated with existing primary landing gear systems while fitting within the existing space designed to receive the landing gear when the landing gear is retracted and stowed.

Figure 20:
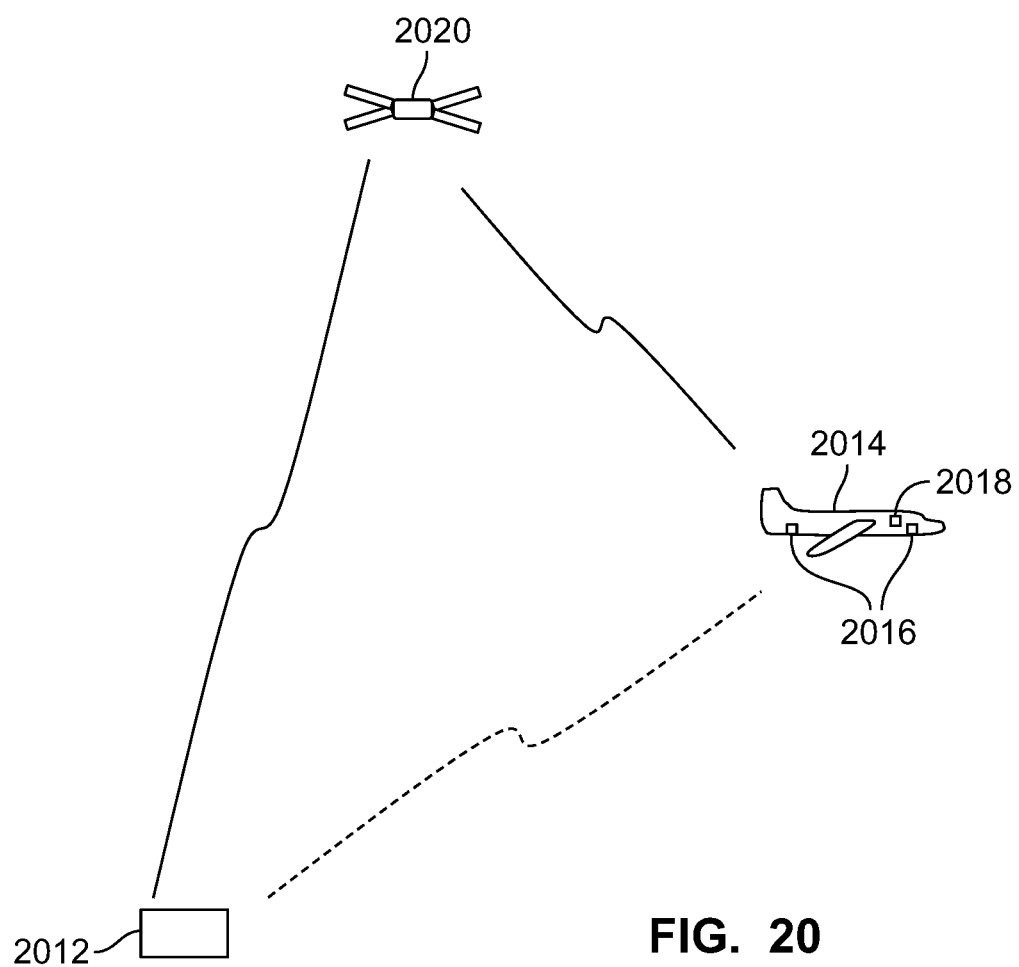
FIG. 20 shows a simplified block diagram of an aircraft control system in communication with a remote aircraft and upon which are mounted landing gear emergency deployment systems, in accordance with some embodiments.

FIG. 20 shows a simplified block diagram of an aircraft control system 2012 in communication with a remote aircraft 2014 and upon which are mounted landing gear emergency deployment systems 2016 (such as one or more of those described above) cooperated with landing gear, in accordance with some embodiments. The aircraft control system 2012 is configured to provide control signals to at least activate the emergency deployment system. In many embodiments, the control system 2012 is further configured to provide control signals to the aircraft to control the flight of the aircraft. Further, in many embodiments, a geographically remote pilot or operator is positioned at the control system and remotely controls the aircraft 2014 based on information (e.g., video, images, sensor data, and other such information). For example, in some instances, the aircraft receives flight instructions that dictate flight control over the airplane and/or surveillance instructions that dictate control over surveillance equipment of the airplane from a remote operator located at a geographically remote location from the airplane. In response to the instructions, the aircraft implements the flight instructions to modify one of a current direction of travel and altitude of the airplane, and/or implements the surveillance instructions to modify an operation of one or more surveillance equipment carried on the airplane.

In some implementations, the control system 2012 communicates directly with the emergency deployment system (e.g., through a control circuitry 318) and/or a control system 2018 of the aircraft 2014, which in turn can activate the emergency deployment system in response to remote commands and/or in response to detecting a malfunction, failure, error or the like. In other embodiments, the control system 2012 communicates with the emergency deployment system 2016 and/or a control system 2018 of the aircraft 2014 through one or more wired and/or wireless communication links, such as via one or more satellites 2020 orbiting the earth, one or more antennas, fiber optic cables, and/or other such links or combinations of such types of links. This allows the aircraft, in at least some implementations, to be operated from extremely remote locations including on opposite sides of the world.

FIG. 21 shows a simplified flow diagram of a process 2110 of controlling one or more landing gear emergency deployment systems, in accordance with some embodiments. In step 2112, an error or malfunction is detected indicating that one or more landing gear of an aircraft cannot effectively deploy to a sufficient position to support the airplane and/or has not fully deployed in response to an instruction to deploy. In step 2114, a notification is communicated to a location remote from the aircraft regarding the detected error or malfunction that the landing gear has not fully deployed. As introduced above, in some implementations, the emergency deployment system and/or the aircraft may be operated and controlled by an operator that is not on the aircraft, but instead at a remote location. As such, the communication of the notification can be via a wireless communication.

In step 2116, the emergency deployment system is triggered to override the primary landing gear drive system. In many embodiments, this includes activating the release link 314 to disengage the coupling between the drive shaft 114 of a primary landing gear drive system 110 and the landing gear coupler 312 that is coupled with the landing gear. In step 2118, the landing gear coupler is moved independent of the drive shaft 114 to the deployed position deploying the landing gear. In many implementations, one or more override drivers 316 cause the landing gear coupler to be moved independent of the drive shaft 114 to the deployed position. Further, in some embodiments, the emergency deployment system is triggered to override the primary landing gear drive system and deploy the landing gear. The trigging typically includes activating the release link to disengage causing a decoupling between the drive shaft 114 of the primary landing gear drive system 110 and the landing gear coupler 312 coupled with the landing gear. As described above and in accordance with some embodiments, the triggering of the release link 314 allows the override driver 316 to move the first casing and/or the landing gear coupler 312, independent of the drive shaft 114 and primary landing gear drive system, toward the deployed position and cause the landing gear 116 to deploy independent of the drive shaft and primary landing gear drive system 110.

Further, the emergency deployment system is typically triggered in response to an instruction to activate the emergency deployment system. In some embodiments, the instruction is received wirelessly from a remote operator of the aircraft, and typically in response to the notification of the malfunction. In other embodiments, the instruction may be received from the controller of the emergency deployment system and/or a control system on the aircraft that evaluates the error condition and/or malfunction (e.g., through one or more sensors in relation to one or more thresholds). In some implementations, the aircraft control system may issue the emergency deploy command through an automated process without confirmation or instruction from a remote operator. For example, in some embodiments, the emergency deployment system is at least partially automated, where a control system detects the error and/or malfunction of the deployment of the landing gear and actuates the emergency deployment system. In other instances, however, instructions to deploy and/or confirmation is received from a remote operator and/or a remote control system that operates separate from the aircraft. For example, in some implementations, a remote operator may be provided information regarding the operation of the aircraft and/or the landing gear (e.g., based on one or more sensors in the airplane detecting the operation, deployment and/or retraction of the landing gear). The operator may additionally or alternatively use one or more cameras on the aircraft to determine and/or confirm whether the one or more landing gear has deployed or sufficiently deployed. In response to determining that the landing gear is not fully or sufficiently deployed, the operator activates one or more of the landing gear emergency deployment systems 2016 on the aircraft.

The instruction to activate the emergency deployment system, in some embodiments, causes the control circuitry 318 to trigger the release link 314. For example, the control circuitry can activate an explosive charge (e.g., an explosive bolt) breaking a coupling between the drive shaft and the landing gear coupler. The activation of the emergency deploy system, in some embodiments, further causes a release of stored potential energy that drives the landing gear coupler coupled with the landing gear away from the drive shaft and deploys the landing gear.

FIG. 22 shows a simplified flow diagram of a process 2210 of controlling one or more emergency deployment systems through a remote control system, in accordance with some embodiments. In step 2212, information is received at a remote operator control system from an aircraft regarding at least the operation of one or more landing gear systems of the aircraft. The information may identify the relevant landing gear and provide information about a current position of the landing gear, an operating status of the landing gear, a confirmation or lack of confirmation from the airplane regarding full deployment, whether a malfunction or other error is detected and/or other such information.

In step 2214, information corresponding to the information received regarding the landing gear is displayed to the operator. The information may be graphically displayed (e.g., as a graphical bar indicating an operation of the landing gear), an animation and/or image may be displayed, one or more warning indicators and/or notices may be displayed and/or other such production of information. Some embodiments may additionally or alternatively generate audio information, such as an alarm sound, a vocalization of information and the like.

Some embodiments include optional step 2216, where instructions are received from the operator directing control of one or more cameras on the aircraft to capture video and/or images of one or more of the landing gear of the aircraft. In optional step 2218, control signals are communicated to the aircraft, in response to the camera instructions received from the operator, directing one or more cameras to be positioned such that one or more of the landing gear. In optional step 2220, content from the one or more cameras are received from the aircraft and displayed to at least the operator. In step 2222, an instruction is received from the operator to activate one or more of the landing gear emergency deployment systems on the aircraft and to override the primary landing gear drive system. In step 2224, the instruction is communicated to the aircraft to cause an activation of one or more emergency deployment systems.

Figure 23:
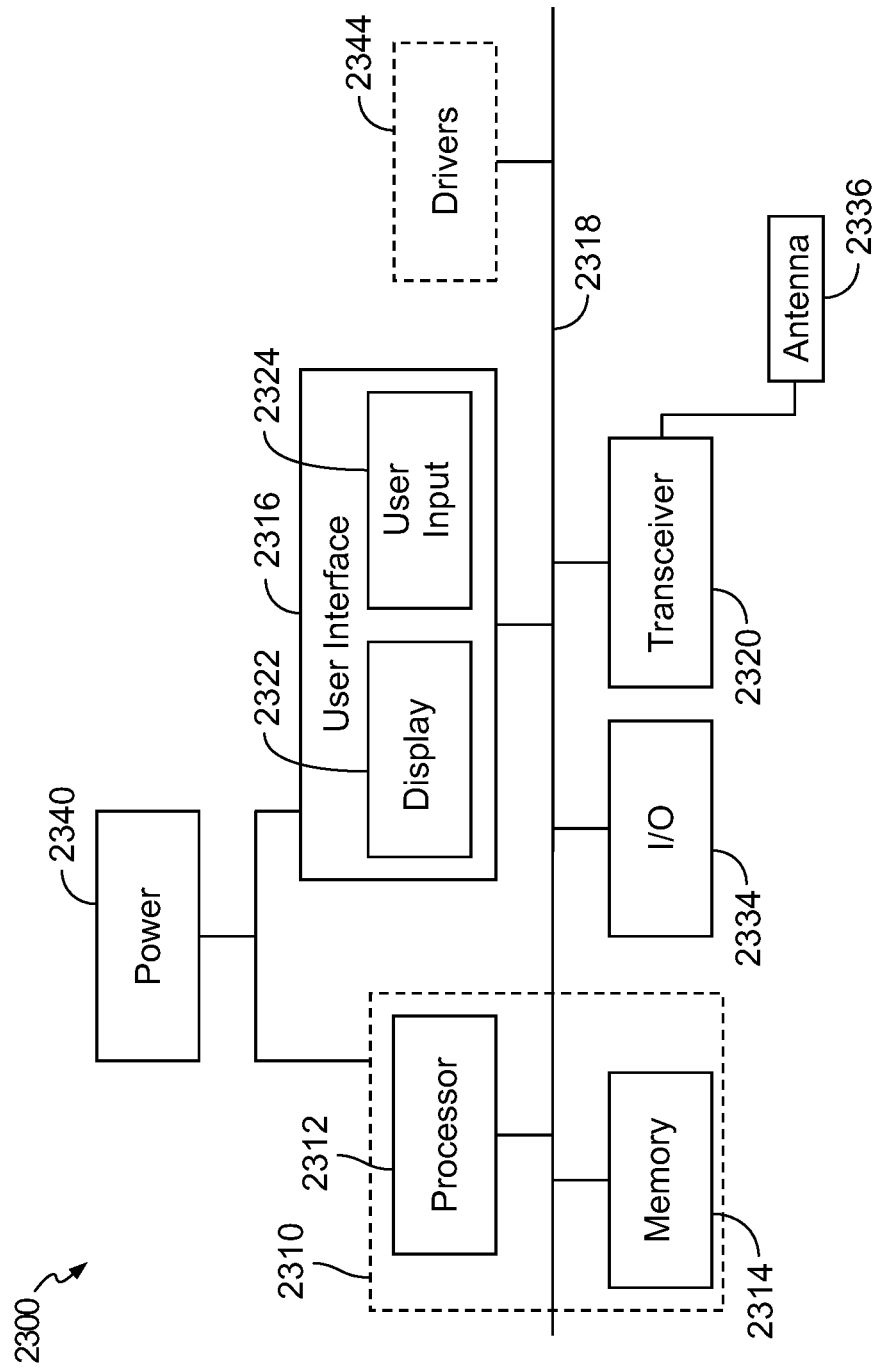
FIG. 23 illustrates a system for use in implementing methods, techniques, devices, apparatuses, systems, servers, sources and the like in providing user interactive virtual environments in accordance with some embodiments.

The methods, techniques, systems, devices, services, servers, sources and the like described herein may be utilized, implemented and/or run on many different types of devices and/or systems. Referring to FIG. 23, there is illustrated a system 2300 that may be used for any such implementations, in accordance with some embodiments. One or more components of the system 2300 may be used for implementing any system, apparatus, controller, control system, or device mentioned above or below, or parts of such systems, apparatuses or devices, such as for example any of the above or below mentioned control circuitry 318, landing gear control system, aircraft control system, remote operator control system, operator interface, other such systems, such as for example sensor circuitry and/or system, surveillance devices and/or systems, surveillance control systems, cameras, and other such devices, circuitry, systems and the like. However, the use of the system 2300 or any portion thereof is certainly not required.

By way of example, the system 2300 may comprise a controller or processor module 2312, memory 2314, a user interface 2316, and one or more communication links, paths, buses or the like 2318. A power source or supply 2340 is included or coupled with the system 2300. The controller 2312 can be implemented through one or more processors, microprocessors, central processing unit, logic, local digital storage, firmware and/or other control hardware and/or software, and may be used to execute or assist in executing the steps of the methods and techniques described herein, and control various communications, programs, services, interfaces, landing gear emergency deployment, landing gear deployment, etc. Further, in some embodiments, the controller 3212 can be part of a control system 2310 and/or implemented through one or more processors with access to one or more memory 2314. The user interface 2316 can allow a user or operator to interact with the system 2300 and receive information through the system. In some instances, the user interface 2316 includes a display 2322 and/or one or more user inputs 2324, such as a keyboard, mouse, remote control, track ball, game controller, buttons, touch screen, etc., which can be part of or wired or wirelessly coupled with the system 2300 and/or controller 2312.

Typically, the system 2300 further includes one or more communication interfaces, ports, transceivers 2320 and the like allowing the system 2300 to communication over a communication bus, a distributed network, a local network, the Internet, communication link 2318, other networks or communication channels with other devices and/or other such communications or combinations thereof. Further the transceiver 2320 can be configured for wired, wireless, optical, fiber optical cable or other such communication configurations or combinations of such communications. In some embodiments, the transceiver 2320 is a wireless transceiver that coupled with the control circuitry or controller 318, and forwards at least some of the received communications to the control circuitry. For example, in some embodiments, the control circuitry is configured to receive an instruction, through the wireless transceiver 2320, to override the primary landing gear drive system 110 and to trigger the release link to disengage the coupling between the drive shaft 114 and the landing gear coupler 312 in response to the instruction to override the primary landing gear drive system.

The system 2300 comprises an example of a control and/or processor-based system with the controller 2312. Again, the controller 2312 can be implemented through one or more processors, controllers, central processing units, logic, software and the like. Further, in some implementations the controller 2312 may provide multiprocessor functionality.

The memory 2314, which can be accessed by the controller 2312, typically includes one or more processor readable and/or computer readable media accessed by at least the controller 2312, and can include volatile and/or nonvolatile media, such as RAM, ROM, EEPROM, flash memory and/or other memory technology. Further, the memory 2314 is shown as internal to a system 2310; however, the memory 2314 can be internal, external or a combination of internal and external memory. Similarly, some or all of the memory 2314 can be internal, external or a combination of internal and external memory of the controller 2312. The external memory can be substantially any relevant memory such as, but not limited to, one or more of flash memory secure digital (SD) card, universal serial bus (USB) stick or drive, other memory cards, hard drive and other such memory or combinations of such memory. The memory 2314 can store code, software, executables, scripts, data, content, multimedia content, coordinate information, programming, programs, global positioning information, surveillance information, instructions, log or history data, operator information and the like.

Some embodiments further include on or more actuators and/or drivers 2344, such as primary actuator 112, landing gear door driver, rudder driver, flaps driver, override driver, and/or other such relevant drivers or combinations of such drivers. The one or more drivers may be controlled by the controller 2312, include an internal controller or control system, receive instructions from a separate controller or control system and the like.

One or more of the embodiments, methods, processes, approaches, and/or techniques described above or below may be implemented in one or more computer programs executable by a processor-based system. By way of example, such a processor based system may comprise the processor based system 2300, an airplane control system, a primary landing gear control system, operator control system, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for controlling the primary landing gear system, activating the landing gear emergency deployment system, etc. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: detecting that a landing gear of an airplane has not fully deployed in response to an instruction to deploy; communicating a notification that the landing gear has not fully deployed; and activating a release link in response to an instruction to activate an emergency deployment of the landing gear, such that a landing gear coupler is driven away from a drive shaft of a landing gear system and deploying the landing gear independent of the drive shaft.

Exemplary processes and/or methods are representatively described above based on one or more flow diagrams, timing diagrams and/or diagrams representing sequences of actions and/or communications that include one or more steps, subprocesses, communications and/or other such representative divisions of the processes, methods, etc. These steps, subprocesses or other such actions can be performed in different sequences without departing from the spirit of the processes, methods and apparatuses. Additionally or alternatively, one or more steps, subprocesses, actions, etc. can be added, removed or combined in some implementations.

While the invention herein disclosed has been described by means of specific embodiments, examples and applications thereof, numerous modifications and variations could be made thereto by those skilled in the art without departing from the scope of the invention set forth in the claims.

What is claimed is:

1. An apparatus configured to deploy a landing gear of an aircraft, the apparatus comprising:
   a landing gear coupler configured to couple with the landing gear of the aircraft;
   a release link coupled with the landing gear coupler and configured to cooperate the landing gear coupler with a drive shaft of an electro-mechanical primary landing gear drive system, wherein the drive shaft is configured, in response to an actuator moving the drive shaft during normal intended operation of the primary landing gear drive system, to drive the landing gear between a stowed position and a deployed position; and
   an override driver cooperated with the landing gear coupler;
   wherein the release link is configured to releasably maintain a relative position of the landing gear coupler relative to the drive shaft such that a drive force from the drive shaft is transferred to the landing gear to effect movement of the landing gear between the stowed position and the deployed position, and the release link is configured to disengage a coupling between the drive shaft and the landing gear coupler such that the landing gear coupler is configured to move at least in a direction toward the deployed position independent of the drive shaft; and
   wherein the override driver is configured to drive the landing gear coupler, independent of the drive shaft, to force the landing gear to transition to the deployed position when the release link disengages the coupling between the landing gear coupler and the drive shaft;
   a first casing coupled with the landing gear coupler;
   a second casing positioned adjacent the first casing, wherein the second casing comprises a drive shaft connector configured to secure the second casing with the drive shaft;
   wherein the release link couples between the first casing and the second casing and is configured, when engaged, to maintain a position of the first casing relative to the second casing, and is configured, when the release link disengages, to decouple the first casing from the second casing such that the first casing is configured to move relative to the second casing.

2. The apparatus of claim 1, wherein the override driver is cooperated with the first casing and configured to drive the first casing to the deployed position deploying the landing gear regardless of a position of the drive shaft in response to the release link disengaging the first casing from the second casing.

3. The apparatus of claim 1, wherein the override driver is positioned between the first casing and the second casing such that potential energy of the override driver is configured to be released in response to the release link disengaging the coupling between the first casing and the second casing and to drive the first casing and the landing gear coupler to the deployed position.

4. The apparatus of claim 1, wherein the first casing is coaxially aligned with the second casing and configured to move along at least a portion of a length of the second casing as the override driver moves the first casing to the deployed position.

5. The apparatus of claim 1, wherein the second casing is configured to be coaxially aligned with the drive shaft and positioned about at least a portion of a length of the drive shaft.

6. The apparatus of claim 1, further comprising:
   a locking system secured with the first casing and positioned in contact with at least a portion of an exterior surface of the second casing, wherein the locking system allows movement between the first casing and the second casing in a first direction as the first casing moves toward the deployed position, and resists movement of the first casing relative to the second casing in a second direction that is away from the deployed position.

7. An apparatus configured to deploy a landing gear of an aircraft, the apparatus comprising:
   a landing gear coupler configured to couple with the landing gear of the aircraft;
   a release link coupled with the landing gear coupler and configured to cooperate the landing gear coupler with a drive shaft of an electro-mechanical primary landing gear drive system, wherein the drive shaft is configured, in response to an actuator moving the drive shaft during normal intended operation of the primary landing gear drive system, to drive the landing gear between a stowed position and a deployed position; and
   an override driver cooperated with the landing gear coupler;
   wherein the release link is configured to releasably maintain a relative position of the landing gear coupler relative to the drive shaft such that a drive force from the drive shaft is transferred to the landing gear to effect movement of the landing gear between the stowed position and the deployed position, and the release link is configured to disengage a coupling between the drive shaft and the landing gear coupler such that the landing gear coupler is configured to move at least in a direction toward the deployed position independent of the drive shaft;
   wherein the override driver is configured to drive the landing gear coupler, independent of the drive shaft, to force the landing gear to transition to the deployed position when the release link disengages the coupling between the landing gear coupler and the drive shaft;
   wherein the override driver comprises a first spring positioned to store potential energy while the release link maintains the positional relationship of the landing gear coupler relative to the drive shaft, and to apply force to move the landing gear coupler to the deployed position moving the landing gear coupler independent of the drive shaft;
   wherein the override driver comprises a second spring configured to that apply force, in response to the release link disengaging, to move the landing gear coupler over only a first portion of a distance traveled by the landing gear coupler when moving to the deployed position; and wherein the first spring is configured to apply the first force to move the landing gear coupler over at least a second portion of the distance traveled by the landing gear coupler when moving to the deployed position.

8. The apparatus of claim 1, wherein the release link comprises an explosive bolt configured to detonate and break the release link to cause the disengagement of the coupling between the drive shaft and the landing gear coupler.

9. The apparatus of claim 1, further comprising:
a deployment damper cooperated with the landing gear coupler, wherein the deployment damper is configured to limit a speed at which the landing gear coupler moves, when driven by the override driver, between the stowed position and the deployed position.

10. The apparatus of claim 1, further comprising:
a controller coupled with the release link, wherein the controller is configured to trigger the release link to disengage the coupling between the drive shaft and the landing gear coupler such that the override driver is activated to drive the landing gear coupler to the deployed position.

11. The apparatus of claim 10, further comprising:
a wireless transceiver coupled with the controller;
wherein the controller is further configured to receive an instruction, through the wireless transceiver, to override the primary landing gear drive system and to trigger the release link to disengage the coupling between the drive shaft and the landing gear coupler in response to the instruction to override the primary landing gear drive system.

\* \* \* \* \*